United States Patent
Russ et al.

(10) Patent No.: US 7,860,250 B2
(45) Date of Patent: *Dec. 28, 2010

(54) APPARATUS FOR ENTITLING AND TRANSMITTING SERVICE INSTANCES TO REMOTE CLIENT DEVICES

(76) Inventors: Samuel H. Russ, 1450 Turtle Dove La., Lawrenceville, GA (US) 30043; Michael A. Gaul, 652 Brass Key Ct., Lawrenceville, GA (US) 30045; Anthony J. Wasilewski, 10680 Wren Ridge Rd., Alpharetta, GA (US) 30022; Howard G. Pinder, 4317 Stilson Cir., Norcross, GA (US) 30092

( * ) Notice: Subject to any disclaimer, the term of this patent is extended or adjusted under 35 U.S.C. 154(b) by 15 days.

This patent is subject to a terminal disclaimer.

(21) Appl. No.: 12/327,157

(22) Filed: Dec. 3, 2008

(65) Prior Publication Data

US 2009/0089369 A1    Apr. 2, 2009

Related U.S. Application Data

(63) Continuation of application No. 11/671,506, filed on Feb. 6, 2007, now Pat. No. 7,505,592, which is a continuation of application No. 10/382,944, filed on Mar. 6, 2003, now Pat. No. 7,181,010, which is a continuation-in-part of application No. 10/154,495, filed on May 24, 2002, now Pat. No. 6,748,080.

(51) Int. Cl.
    *H04N 7/167* (2006.01)
(52) U.S. Cl. .................. 380/234; 380/211; 725/25; 725/31
(58) Field of Classification Search .............. 380/211, 380/234
    See application file for complete search history.

(56) References Cited

U.S. PATENT DOCUMENTS

| 5,742,677 A | 4/1998 | Pinder et al. |
| 5,742,686 A | 4/1998 | Finley |
| 5,796,829 A | 8/1998 | Newby et al. |
| 5,856,975 A | 1/1999 | Rostoker et al. |

(Continued)

FOREIGN PATENT DOCUMENTS

EP    0782296 A2    2/1997

(Continued)

OTHER PUBLICATIONS

"Explorer 8300 Series Digital Recorder" ScientificAtlanta.com [online] Oct. 2005, XP002459851, Retrieved from the Internet: URL:http://www.cisco.com/application/pdf/en/us/guest/products/ps8613/c1650/cdccont_0900aecd806c6913.pdf. [retreived on Nov. 22, 2007].

(Continued)

*Primary Examiner*—Matthew B Smithers
(74) *Attorney, Agent, or Firm*—Merchant & Gould

(57) ABSTRACT

A server in a subscriber television network receives service instances from a headend of the subscriber television network. The server is adapted to encrypt according to an encryption scheme and re-transmit service instances to a client-receiver. The server reformats the service instance from a first format into a second format the client-receiver can access the service instance.

40 Claims, 9 Drawing Sheets

U.S. PATENT DOCUMENTS

| | | | |
|---|---|---|---|
| 5,870,474 A | 2/1999 | Wasilewski et al. | |
| 5,872,846 A | 2/1999 | Ichikawa | |
| 5,905,522 A | 5/1999 | Lawler | |
| 5,915,068 A | 6/1999 | Levine | |
| 5,917,822 A | 6/1999 | Lyles et al. | |
| 5,933,503 A | 8/1999 | Schell et al. | |
| 5,940,391 A | 8/1999 | Malkin et al. | |
| 5,943,047 A | 8/1999 | Suzuki | |
| 5,961,603 A | 10/1999 | Kunkel et al. | |
| 5,987,572 A | 11/1999 | Weidner et al. | |
| 5,990,881 A | 11/1999 | Inoue et al. | |
| 5,990,927 A | 11/1999 | Hendricks et al. | |
| 5,999,970 A | 12/1999 | Krisbergh et al. | |
| 6,005,938 A | 12/1999 | Banker et al. | |
| 6,006,257 A | 12/1999 | Slezak | |
| 6,020,982 A | 2/2000 | Yamauchi et al. | |
| 6,035,281 A | 3/2000 | Crosskey et al. | |
| 6,057,872 A | 5/2000 | Candelore | |
| 6,088,455 A | 7/2000 | Logan et al. | |
| 6,098,056 A | 8/2000 | Rusnak et al. | |
| 6,105,134 A | 8/2000 | Pinder et al. | |
| 6,108,002 A | 8/2000 | Ishizaki | |
| 6,118,976 A | 9/2000 | Arias et al. | |
| 6,157,377 A | 12/2000 | Shah-Nazaroff et al. | |
| 6,157,719 A | 12/2000 | Wasilewski et al. | |
| 6,173,400 B1 | 1/2001 | Perlman et al. | |
| 6,185,625 B1 | 2/2001 | Tso et al. | |
| 6,229,895 B1 | 5/2001 | Son et al. | |
| 6,230,269 B1 | 5/2001 | Spies et al. | |
| 6,246,767 B1 | 6/2001 | Akins, III et al. | |
| 6,252,964 B1 | 6/2001 | Wasilewski et al. | |
| 6,253,375 B1 | 6/2001 | Gordon et al. | |
| 6,292,568 B1 | 9/2001 | Akins, III et al. | |
| 6,305,020 B1 | 10/2001 | Hoarty et al. | |
| 6,345,307 B1 | 2/2002 | Booth | |
| 6,356,971 B1 | 3/2002 | Katz et al. | |
| 6,366,987 B1 | 4/2002 | Tzelnic et al. | |
| 6,378,130 B1 | 4/2002 | Adams | |
| 6,401,243 B1 | 6/2002 | Suzuki | |
| 6,424,714 B1 | 7/2002 | Wasilewski et al. | |
| 6,424,717 B1 | 7/2002 | Pinder et al. | |
| 6,459,427 B1 | 10/2002 | Mao et al. | |
| 6,484,318 B1 | 11/2002 | Shioda et al. | |
| 6,510,519 B2 | 1/2003 | Wasilewski et al. | |
| 6,516,412 B2 | 2/2003 | Wasilewski et al. | |
| 6,526,508 B2 | 2/2003 | Akins, III et al. | |
| 6,532,593 B1 | 3/2003 | Moroney | |
| 6,543,053 B1 | 4/2003 | Li et al. | |
| 6,549,577 B2 | 4/2003 | Florencio et al. | |
| 6,550,008 B1 | 4/2003 | Zhang et al. | |
| 6,560,340 B1 | 5/2003 | Akins, III et al. | |
| 6,574,609 B1 | 6/2003 | Downs et al. | |
| 6,636,953 B2 | 10/2003 | Yuasa et al. | |
| 6,727,944 B1 | 4/2004 | Adachi | |
| 6,744,892 B2 | 6/2004 | Akins, III et al. | |
| 6,748,080 B2 | 6/2004 | Russ et al. | |
| 6,804,357 B1 | 10/2004 | Ikonen et al. | |
| 6,937,729 B2 | 8/2005 | Akins, III et al. | |
| 6,963,972 B1 | 11/2005 | Chang et al. | |
| 6,971,008 B2 | 11/2005 | Wasilewski et al. | |
| 7,062,658 B1 | 6/2006 | Cheriton et al. | |
| 7,065,216 B1 | 6/2006 | Benaloh et al. | |
| 7,089,579 B1 | 8/2006 | Mao et al. | |
| 7,107,416 B2 | 9/2006 | Stuart et al. | |
| 7,146,388 B2 | 12/2006 | Stakutis et al. | |
| 7,155,609 B2 | 12/2006 | Chan et al. | |
| 7,181,010 B2 | 2/2007 | Russ et al. | |
| 7,200,868 B2 | 4/2007 | Mattox et al. | |
| 7,212,725 B2 | 5/2007 | Gunji et a | |
| 7,233,959 B2 | 6/2007 | Kanellos et al. | |
| 7,363,326 B2 | 4/2008 | Margolus | |
| 7,505,592 B2 * | 3/2009 | Russ et al. | 380/234 |
| 7,602,913 B2 | 10/2009 | Wasilewski | |
| 7,602,914 B2 | 10/2009 | Wasilewski | |
| 7,630,499 B2 | 12/2009 | Wasilewski | |
| 7,650,442 B2 | 1/2010 | Ashley et al. | |
| 2001/0006400 A1 | 7/2001 | Kubo et al. | |
| 2001/0049824 A1 | 12/2001 | Baker et al. | |
| 2002/0013772 A1 | 1/2002 | Peinado | |
| 2002/0018130 A1 | 2/2002 | Suemoto et al. | |
| 2002/0026582 A1 | 2/2002 | Futamura et al. | |
| 2002/0044658 A1 | 4/2002 | Wasilewski et al. | |
| 2002/0094084 A1 | 7/2002 | Wasilewski et al. | |
| 2002/0099663 A1 | 7/2002 | Yoshino et al. | |
| 2002/0116708 A1 | 8/2002 | Morris et al. | |
| 2002/0144067 A1 | 10/2002 | Jeong | |
| 2002/0146237 A1 | 10/2002 | Safadi | |
| 2002/0184457 A1 | 12/2002 | Yuasa et al. | |
| 2002/0199190 A1 | 12/2002 | Su | |
| 2003/0005446 A1 | 1/2003 | Jaff et al. | |
| 2003/0005454 A1 | 1/2003 | Rodriguez et al. | |
| 2003/0009668 A1 | 1/2003 | Chan | |
| 2003/0028890 A1 | 2/2003 | Swart et al. | |
| 2003/0093680 A1 | 5/2003 | Astley et al. | |
| 2003/0110234 A1 | 6/2003 | Egli et al. | |
| 2003/0161617 A1 | 8/2003 | Um et al. | |
| 2003/0188164 A1 | 10/2003 | Okimoto et al. | |
| 2003/0200337 A1 | 10/2003 | Jabri et al. | |
| 2004/0039911 A1 | 2/2004 | Oka et al. | |
| 2004/0045030 A1 | 3/2004 | Reynolds et al. | |
| 2004/0052377 A1 | 3/2004 | Mattox et al. | |
| 2004/0068739 A1 | 4/2004 | Russ et al. | |
| 2004/0117831 A1 | 6/2004 | Ellis et al. | |
| 2004/0128499 A1 | 7/2004 | Peterka et al. | |
| 2004/0187014 A1 | 9/2004 | Molaro | |
| 2004/0193921 A1 | 9/2004 | Byrne | |
| 2004/0236804 A1 | 11/2004 | Bots et al. | |
| 2004/0237100 A1 | 11/2004 | Pinder et al. | |
| 2005/0076066 A1 | 4/2005 | Stakutis et al. | |
| 2005/0080497 A1 | 4/2005 | Rao | |
| 2005/0091173 A1 | 4/2005 | Alve | |
| 2005/0100162 A1 | 5/2005 | Alve et al. | |
| 2005/0102513 A1 | 5/2005 | Alve | |
| 2005/0111835 A1 | 5/2005 | Friel et al. | |
| 2005/0223414 A1 | 10/2005 | Kenrich et al. | |
| 2005/0232593 A1 | 10/2005 | Kanai | |
| 2005/0237396 A1 | 10/2005 | Hagiwara et al. | |
| 2005/0240708 A1 | 10/2005 | Shaver et al. | |
| 2006/0013566 A1 | 1/2006 | Nakamura | |
| 2006/0020786 A1 | 1/2006 | Helms et al. | |
| 2006/0039256 A1 | 2/2006 | Nakamura et al. | |
| 2006/0039559 A1 | 2/2006 | Wasilewski | |
| 2006/0039560 A1 | 2/2006 | Wasilewski | |
| 2006/0041905 A1 | 2/2006 | Wasilewski | |
| 2006/0072752 A1 | 4/2006 | Nakano et al. | |
| 2006/0074807 A1 | 4/2006 | Gauba et al. | |
| 2006/0109854 A1 | 5/2006 | Cancel | |
| 2006/0156382 A1 | 7/2006 | Motoyama | |
| 2006/0179478 A1 | 8/2006 | Han et al. | |
| 2006/0184733 A1 | 8/2006 | Yamamoto et al. | |
| 2006/0200865 A1 | 9/2006 | Leake et al. | |
| 2007/0055390 A1 | 3/2007 | Simon et al. | |
| 2007/0130254 A1 | 6/2007 | Russ et al. | |
| 2007/0277205 A1 | 11/2007 | Grannan | |

FOREIGN PATENT DOCUMENTS

| | | |
|---|---|---|
| EP | 1014715 A2 | 12/1999 |
| EP | 1213919 A2 | 6/2002 |
| FR | 2 779 599 | 12/1999 |
| GB | 2403586 A | 1/2005 |
| KR | 10-2003-0037 | 5/2003 |
| KR | 10-2004-0062 | 7/2004 |
| WO | 0011840 | 3/2000 |

| | | |
|---|---|---|
| WO | 0051041 | 8/2000 |
| WO | WO 01/18807 | 3/2001 |
| WO | WO 01/75876 | 10/2001 |
| WO | 0182588 | 11/2001 |
| WO | 02097997 A2 | 12/2002 |
| WO | 2004098190 A1 | 11/2004 |
| WO | 2005029843 | 3/2005 |
| WO | 2005029852 | 3/2005 |
| WO | 2005091626 | 9/2005 |
| WO | 2005101411 | 10/2005 |
| WO | 2006038204 | 4/2006 |
| WO | WO 2006/066052 | 6/2006 |
| WO | WO 2008/005699 | 1/2008 |
| WO | WO 2008/005700 | 1/2008 |

OTHER PUBLICATIONS

Gilo: "Do It Yourself Making an External Hard Drive Guide" Notebookreview.com, [online], Jun. 2, 2006, XP002459852, Retrieved from the Internet: URL:http://www.notebookreview.com/default.asp?newsID=2972. [retrieved on Nov. 22, 2007].

U.S. Appl. No. 10/873,805, filed Jun. 22, 2004, Entitled "Validating Client Receivers," Inventors: Pinder et al.

U.S. Appl. No. 10/920,926, filed Aug. 18, 2004, Entitled "Retrieval and Transfer of Encrypted Hard Drive Content from Digital Video Receiver Set Top Box," Inventor: Wasilewski, Anthony.

U.S. Appl. No. 10/920,841, filed Aug. 18, 2004, Entitled "Retrieval and Transfer of Encrypted Hard Drive Content from Digital Video Receiver Set Top Box Utilizing Second Digital Receiver Set Top Box," Inventor: Wasilewski, Anthony.

U.S. Appl. No. 10/920,842, filed Aug. 18, 2004, Entitled "Utilization of Encrypted Hard Drive Content by One Digital Video Receiver Set Top Box when Recorded by Another," Inventor: Wasilewski, Anthony.

U.S. Appl. No. 11/405,205, filed Apr. 17, 2006, Entitled "System and Method for Prioritizing the Storage Location of Media Data" Inventors: Prus et al.

U.S. Appl. No. 11/428,367, filed Jun. 30, 2006, Entitled "Secure Escrow and Recovery of Media Device Content Keys," Inventors: Schlarb et al.

U.S. Appl. No. 11/454,421, filed Jun. 16, 2006, Entitled "Securing Media Content Using Interchangeable Encryption Key," Inventors: Pinder et al.

U.S. Appl. No. 11/428,362, filed Jun. 30, 2006, Entitled "System and Method for Managing Media Data," Inventors Prus et al.

U.S. Appl. No. 11/428,356, filed Jun. 30, 2006, Entitled "System and Method for Applying Retention Rules," Inventors: Prus et al.

U.S. Appl. No. 11/428,357, filed Jun. 30, 2006, Entitled "Digital Media Device having Selectable Media Content Storage Locations," Inventors: Prus et al.

U.S. Appl. No. 11/428,365, filed Jun. 30, 2006, Entitled "Digital Media Device Having Media Content Transfer Capability," Inventors: Russ et al.

U.S. Appl. No. 11/942,778, filed Nov. 20, 2007, Entitled "Retrieval and Transfer of Encrypted Hard Drive Content from Digital Video Receiver Set Top Box to a Content Transcription Device," Inventor: Wasilewski, Anthony.

Allway Sync (Allway Sync 3.2.2), Dec. 6, 2005, pp. 1-14.

Barton "TiVO—Lution: The Challenges of delivery a reliable, easy-to-use DVR service to the masses" ACM QUEUE Apr. 2006 35 more queue: www.acmqueue.com.

Blackcurrant, ("Delete Files Across A Network"), May 11, 2005; accessed Jul. 2, 2010 at http://techrepublic.com.com/5208-6230-0.html?forumID=3&threadID=173478&start=0; 3 pgs.

Boston College, "Copying Files to A USB Drive or External Hard Drive," Nov. 8, 2005, pp. 1-5 http://web.archive.org/web/20060227003853/http://www.bc.edu/offices/help/met-elements/doc/articles/html/HW-usb-drive-copy.shtml.

Chorianopoulous et al. "Affective Usability Evaluation for an Interactive Music Television Channel" ACM Computers in Entertainment, vol. 2, No. 3, Jul. 2004, Article 7b.

Dybwad, B.; ("TiVo 7.2 OS Adds Red Flag Content Protection Feature"), Sep. 14, 2005, pp. 1-5, http://www.engadget.com/2005/09/14/tivo-7-2-os-adds-red-flag-content-protection-feature/.

Ellison, "TiVo Series 2", Jan. 13, 2004, pp. 1-6, http://www.pcmag.com/article2/8,2817,1649659,00.asp.

Eskicioglu et al. "An overview of multimedia content protection in consumer electronics devices," Signal Processing. Image Communication, Elsevier Science Publishers, Ambsterdam, NL, vol. 16, No. 7, Apr. 2001, pp. 681-699, XP004232133 ISSN: 0923-5965.

Haughey, M.; ("PC to TiVo Playback Released"), Oct. 24, 2005, pp. 1-13 http://web.archive.org/web/20051024002825/http://www.pvrblog.com/pvr/2005/08/pc_to_tivo_play.html.

Haughey, M.; ("TiVo 7.2 OS Adds Content Protection, Blocks Transfers, and Auto-Deletes Some Shows"), Sep. 13, 2005, pp. 1-14, http://www.pvrblog.com/pvr/2005/09/tivo_72_os_adds.html.

Menezes, et al.; "Handbook of Applied Cryptography" Handbook of applied Cryptography, CRC Press Series on Discrete Mathematics and Its Applications, Boca Raton, FL CRC Press, 1997, pp. 546, 567-570, XP002356116 ISBN: 0-8493-8523-7.

Old Apps, ("Old Version of WinSCP"), Jan. 13, 2003, pp. 1-3; accessed Jul. 2, 2010 at http://www.oldapps.com/WinSCP.php?old_winscp=2; 3 pgs.

Picker, "The Digital Video Recorder: Unbundling Advertising and Content" Professor of Commercial Law, The University of Chicago Law School, Senior Fellow, The Computation Institute of the University of Chicago and Argonne National Laboratory; Sep. 10, 2003.

Smith, J.; "Files and Folders: Removable Media," Oct. 13, 2004, pp. 1-12http://web.archive.org/web/20041027194919/http://www.jegsworks.com/Lessons/win/filesandfolders/step-removabledisk.htm.

TiVo.com "What is TiVo?", Jan. 14, 2005, pp. 1-12; http://web.archive.org/web/20050114053806/http://www.tivo.com/1.0.asp.

WinFtp, Sep. 8, 2005, pp. 1-7 http://download.cnet.com/WinFtp-Client/3000-2160_4-10429297.html.

Wurmlin et al. "3D Video Record" Proceedings of the $10^{th}$ Pacific Conference on Computer Graphics and Applications (PG'02) IEEE Computer Society.

Australian Office Action mailed Aug. 4, 2009 in Application 2005258137.

Canadian Office Action mailed Aug. 19, 2009 in Application 2,571,533.

European Office Action mailed May 7, 2009 in Application No. 07 840 308.6.

European Office Action mailed Apr. 29, 2009 in Application No. 07 784 510.5.

European Office Action mailed Apr. 29, 2009 in Application No. 07798908.5.

European Office Action mailed Feb. 10, 2009, in Application No. 07798909.3.

European Office Action mailed Feb. 11, 2009, in Application No. 07798908.5.

European Office Action mailed Feb. 18, 2009, in Application No. 07 798 909.3.

European Office Action mailed Jul. 24, 2008 in Application No. 03 755 496.1.

European Office Action mailed Jun. 9, 2009 in Application No. 07 815 092.7.

European Office Action mailed Mar. 16, 2009, in Application No. 07 781 952.2.

European Office Action mailed May 11, 2009 in Application no. 05 766 482.3.

International Preliminary Report mailed Jan. 6, 2009, in PCT/US2007/072328.

International Search Report and Written Opinion dated Dec. 21, 2007, cited in PCT/US2007/071842.

International Search Report and Written Opinion dated Jun. 7, 2006, cited in PCT/US2005/022069.

International Search Report and Written Opinion dated Mar. 10, 2008, cited in PCT/US2007/071841.

International Search Report cited in PCT/US2007/071843 mailed Dec. 27, 2007.

International Search Report dated Jan. 31, 2008, in PCT/US2007/070680.

International Search Report dated Oct. 22, 2003 in PCT/US2003/016585.
Notice of Preliminary Rejection dated May 28, 2010, cited in KR Appl. No. 10-2008-7031848, 7 pgs.
Supplemental European Search Report dated Jan. 24, 2008, in Application No. 03 755 496.01.
Office Action mailed Apr. 1, 2010, in U.S. Appl. No. 11/405,205.
Office Action mailed Apr. 13, 2010, in U.S. Appl. No. 11/454,421.
Office Action mailed Apr. 14, 2010, in U.S. Appl. No. 11/428,367.
Office Action mailed Apr. 2, 2009, in U.S. Appl. No. 11/428,357.
Office Action mailed Apr. 30, 2008, in U.S. Appl. No. 11/482,356.
Office Action mailed Aug. 20, 2007, in U.S. Appl. No. 10/873,805.
Office Action mailed Aug. 4, 2009, in U.S. Appl. No. 11/428,356.
Office Action mailed Aug. 5, 2008, in U.S. Appl. No. 11/428,357.
Office Action mailed Aug. 7, 2009, in U.S. Appl. No. 11/428,362.
Office Action mailed Dec. 12, 2008, in U.S. Appl. No. 11/428,365.
Office Action mailed Dec. 17, 2008, in U.S. Appl. No. 10/873,805.
Office Action mailed Dec. 9, 2009, in U.S. Appl. No. 11/428,357.
Office Action mailed Feb. 1, 2010, in U.S. Appl. No. 11/428,356.
Office Action mailed Jan. 14, 2010, in U.S. Appl. No. 11/428,362.
Office Action mailed Jan. 9, 2008, in U.S. Appl. No. 10/873,805.
Office Action mailed Jul. 22, 2009, in U.S. Appl. No. 11/428,357.
Office Action mailed Jul. 9, 2008, in U.S. Appl. No. 10/873,805.
Office Action mailed Mar. 18, 2009, in U.S. Appl. No. 11/428,362.
Office Action mailed May 11, 2010, in U.S. Appl. No. 11/428,357.
Office Action mailed May 26, 2010, in U.S. Appl. No. 11/428,362.
Office Action mailed May 28, 2009, in U.S. Appl. No. 11/428,365.
Office Action mailed May 5, 2010, in U.S. Appl. No. 11/428,365.
Office Action mailed Nov. 28, 2008, in U.S. Appl. No. 11/482,356.
Office Action mailed Oct. 26, 2009, in U.S. Appl. No. 11/428,365.
Office Action mailed Oct. 28, 2009, in U.S. Appl. No. 11/942,778.
Office Action mailed Oct. 7, 2009, in U.S. Appl. No. 11/428,367.
Office Action mailed Sep. 22, 2009, in U.S. Appl. No. 11/454,421.
Notice of Preliminary Rejection dated Sep. 18, 2010 cited in Korean Application No. 10-2008-7032127.
European Office Action mailed Sep. 9, 2010 in Application No. 07 840 308.6.
Office Action mailed Aug. 31, 2010 in U.S. Appl. No. 11/405,205.
Office Action mailed Oct. 14, 2010 in U.S. Appl. No. 11/428,365.
Office Action mailed Oct. 26, 2010 in U.S. Appl. No. 11/428,357.
Office Action mailed Nov. 2, 2010 in U.S. Appl. No. 11/428,362.

* cited by examiner

APPARATUS FOR ENTITLING AND TRANSMITTING SERVICE INSTANCES TO REMOTE CLIENT DEVICES

CROSS-REFERENCE TO RELATED APPLICATION

This application is a continuation of U.S. Pat. No. 7,505,592 entitled "APPARATUS FOR ENTITLING AND TRANSMITTING SERVICE INSTANCES TO REMOTE CLIENT DEVICES," having Ser. No. 11/671,506 filed Feb. 6, 2007, which is a continuation of U.S. Pat. No. 7,181,010, entitled "APPARATUS FOR ENTITLING REMOTE CLIENT DEVICES," having Ser. No. 10/382,944 filed Mar. 6, 2003, which is a continuation-in-part of U.S. Pat. No. 6,748,080, entitled "APPARATUS FOR ENTITLING REMOTE CLIENT DEVICES," having Ser. No. 10/154,495 filed May 24, 2002, of which are entirely incorporated herein by reference.

FIELD OF THE INVENTION

This invention relates generally to communications systems, such as subscriber television systems, among others, and more specifically to providing service instances to remote devices in the communication systems.

BACKGROUND OF THE INVENTION

Frequently, broadband systems transmit television signals and programs to subscribers of a conditional access system, or a subscriber network system. Broadband systems, such as cable and satellite television systems, typically include a headend for receiving programming and/or data from various sources and redistributing the programming and other data through a distribution system to subscribers. The headend receives programming signals from a variety of sources, such as content providers or entitlement agents, and combines the signals from the various sources, and transmits the combined signals through the distribution system to subscriber equipment. The subscriber network system offers subscribers of the system with services such as, but not limited to, Internet service and telephone service and potentially hundreds of program selections or service instances. Service instances include, but are not limited to, an installment of an audio or visual or audio/visual program. A service instance can be broadcast to all of the subscribers of the conditional access system, a portion of the subscribers, or an individual subscriber. Service instances include regular programming, special programming such as pay-per-view, and subscriber requested services such as personal television.

At a subscriber location, a digital subscriber communications terminal (DSCT) is typically coupled to a coaxial outlet by a short coaxial cable and the coaxial outlet is coupled to the broadband distribution system. Today, there are many subscriber devices such as, but not limited to, smart appliances, laptop computers, personal digital assistants (PDAs), video cassette recorders (VCRs) and televisions that can receive service instances and other information from the subscriber network.

The DSCT and the subscriber devices are sometimes coupled together via a local area network (LAN), which can be wired or wireless or a combination thereof. Wired communication paths include, among others, HomePNA 1, 2, and 3 which uses home telephone lines and coaxial cable and which has a data transfer rate of up to 1, 10, and 100 Mbps, respectively, HomePlug, which has a data transfer rate of 14 Mbps, and Ethernet. Other mechanisms for connecting the DSCT to other subscriber devices include transmitting using QAM modulation over coaxial cables. Wired communication has the disadvantage of requiring that a wire extend from the DSCT to the subscriber device, which in an existing subscriber residence may entail retrofitting the residence, and that can be expensive. Therefore, it is frequently desirable to couple subscriber devices to the DSCT using wireless communication, especially with the proliferation of portable computing devices. Wireless communication allows the subscriber to easily move his or her portable computing device, smart appliance, and other client-devices, within his or her wireless LAN while remaining connected to the subscriber network through the subscriber's DSCT and also eliminating the need to wire multiple rooms with coaxial cable or other wires. Wireless technologies have advanced so that they enable data to be pumped quickly through a wireless connection. The Institute for Electronics and Electrical Engineers (IEEE) 802.11b standard enables the user to transfer data at a rate approximately equal to Ethernet data rates, about 10 Mbps. As such it is sometimes called wireless Ethernet. IEEE 802.11a enables transfer rates of up to 54 Mbps. Industry collaboration, Bluetooth 2.0 enables users to transfer data at a rate of about 10 Mbps. HomeRF 2.0 is another industry collaboration, backed by a few of the same companies promoting the Bluetooth standard, and like Bluetooth 2.0, has a maximum data transfer rate of about 10 Mbps.

However, local area networks introduce security and control concerns for the operators of the subscriber network system due to issues such as payment, theft of services, and privacy. Thus, there exists a need for a system that addresses these concerns.

DETAILED DESCRIPTION

Figure 1:
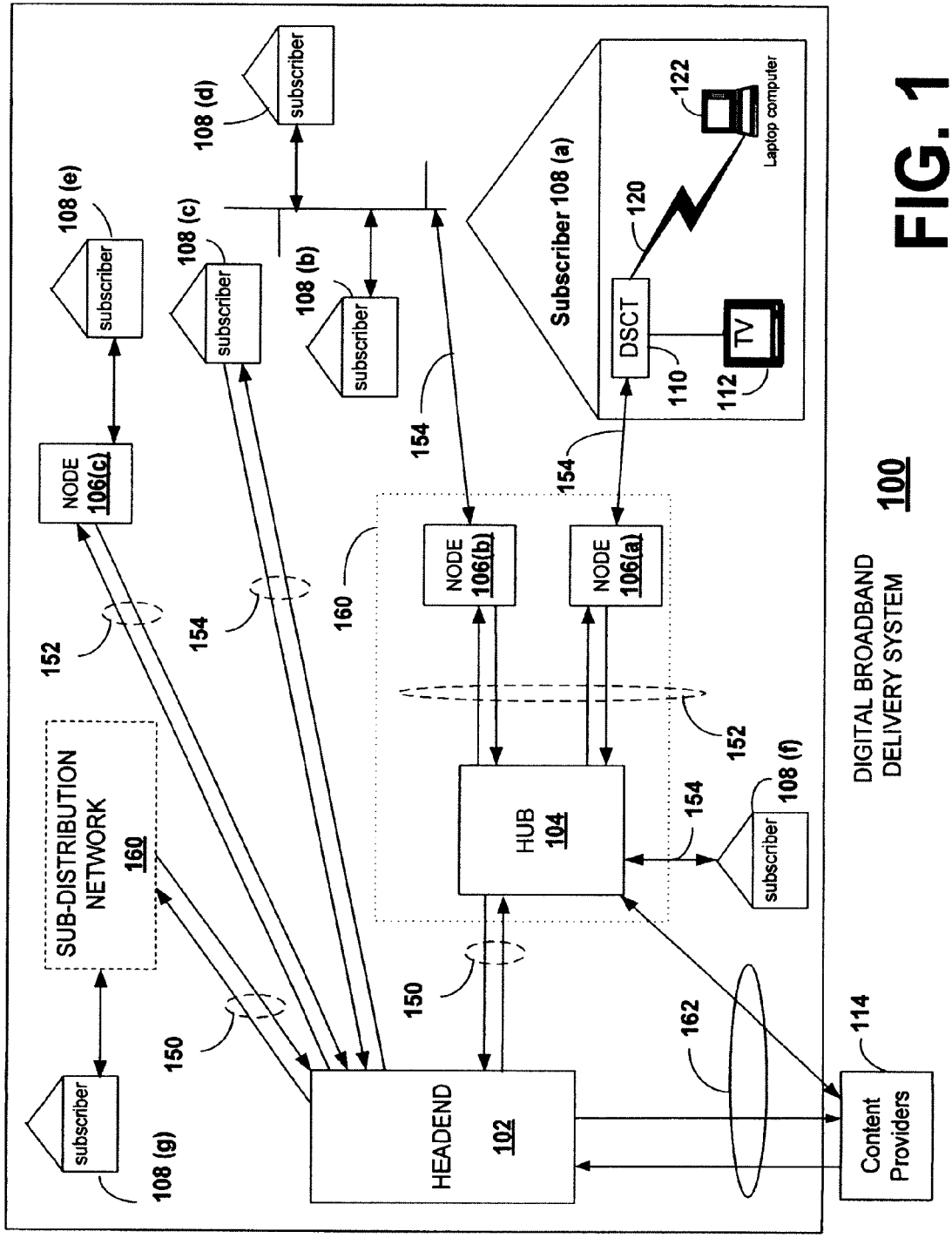
FIG. 1 is a block diagram of a broadband communications system, such as a cable television system, in which the preferred embodiment of the present invention may be employed.

Preferred embodiments of the present invention will be described more fully hereinafter with reference to the accompanying drawings in which like numerals represent like elements throughout the several figures, and in which an exemplary embodiment of the invention is shown. The present invention may, however, be embodied in many different forms and should not be construed as limited to the embodiments set forth herein. The examples set forth herein are non-limiting examples and are merely examples among other possible examples.

In one preferred embodiment, a digital subscriber communication terminal (DSCT), which is located at a subscriber's premises, receives services from the headend of a subscriber television system (STS). The DSCT manages a local area network (LAN) at the subscriber's premises and provides services to client-receivers coupled to the LAN. The DSCT and the client-receivers preferably communicate using web-based protocols such as messages formatted according to HTTP carried in TCP/IP packets. The DSCT is adapted to, among other things, selectively provide the services received from the headend to the client-receivers in a web-based format such as HTTP web pages or other web-based protocols known to those skilled in the art.

In one preferred embodiment, the DSCT receives content from the headend and selectively converts the content from a given format to a new format before providing the content to a client-receiver. The DSCT selects the new format using criteria such as, but not limited to, the transmission path between the client-receiver and the DSCT, and/or the device type of the client-receiver.

In yet another preferred embodiment, a subscriber accesses services provided by the STS using the subscriber's client-receiver. The subscriber uses a web-based browser to display an index of services. Typically, the index is in the form of an electronic program guide, and in the electronic program guide the services are displayed as hyperlinks. The subscriber selects a service by clicking on the hyperlink of the selected service, which causes a message to be transmitted to the DSCT. The DSCT determines whether the client-receiver is entitled to the selected service, and if so, transmits the content of the selected service in a web-based format to the client-receiver. In that case, the web-browser of the client-receiver typically opens a new window for displaying the content of the selected service.

The logic of the preferred embodiment(s) of the present invention can be implemented in hardware, software, firmware, or a combination thereof. In the preferred embodiment(s), the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present invention includes embodying the functionality of the preferred embodiments of the present invention in logic embodied in hardware or software-configured mediums.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, the process descriptions or blocks in flow charts should be understood as representing decisions made by a hardware structure such as a state machine known to those skilled in the art.

Figure 9:
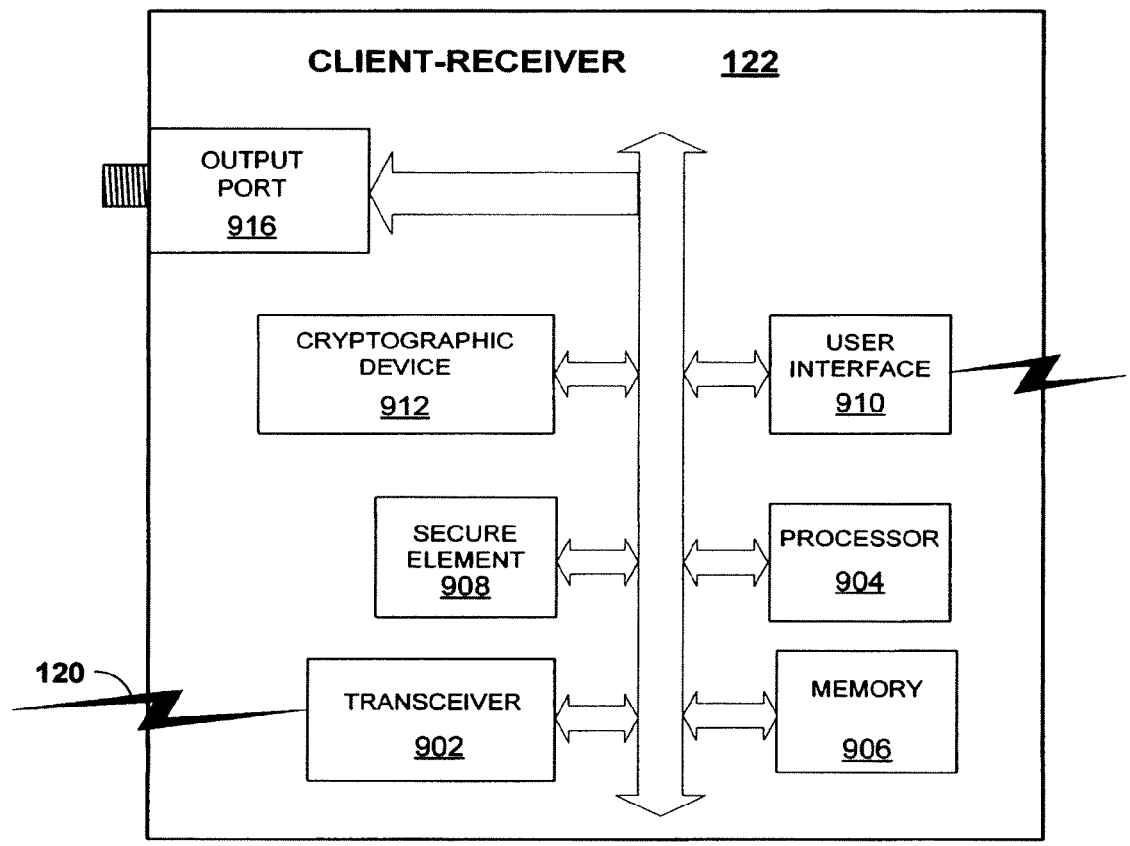
FIG. 9 is a block diagram of a client-receiver.
Figure 10:
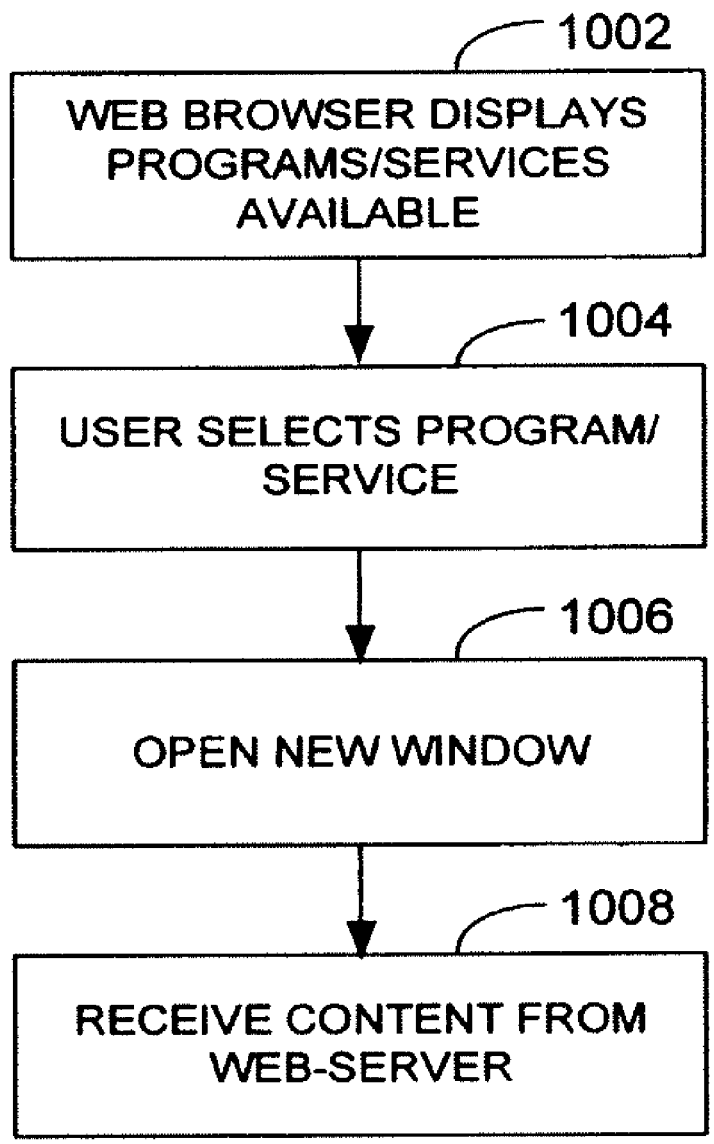
FIG. 10 is a flow chart of steps taken to access web-based services at a client-device.

A description of a subscriber television system is provided hereinbelow. First an overview of a subscriber television system is given in FIG. 1, then a description of the functionality and components of the headend is provided in FIG. 2, and then in FIGS. 3-8 a description of the functionality and components of a DSCT are provided. In FIGS. 9 and 10, a description of the functionality and components of client-receiver at a subscriber's premises is given. Non-limiting embodiments of the present invention are described in the context of a DSCT located at the subscriber's location.

Subscriber Television System Overview

In this discussion, a two-way interactive digital subscriber television system or a digital subscriber network is also referred to as a Digital Broadband Delivery System (DBDS). An overview of an exemplary DBDS is provided in U.S. Pat. No. 6,157,719, entitled "Conditional Access System", which is hereby incorporated by reference herein in its entirety. A function of the DBDS is to: provide interfaces to content providers, service providers and entitlement agents; control access to and the use of the content and services; and to distribute the content and services to subscribers. For the purposes of this disclosure, an entitlement agent is an entity that provides the subscribers of the DBDS with entitlements for services and content associated with the entitlement agent, and an entitlement is the authority to access a service. The content providers and services providers may not want to be in the business of managing entitlements for the subscribers of the DBDS. In that case, the content and services from the content and service providers are associated with the entitlement agent and the entitlement agent provides the subscribers with the entitlements for the associated content and services. In addition, services and content associated with an entitlement agent include services and content provided to the DBDS by the entitlement agent.

The subscriber network system offers subscribers of the system services such as, but not limited to, Internet service and telephone service and potentially hundreds of program selections or service instances. Service instances include, but are not limited to, an installment of an audio or visual or audio/visual program. A service instance can be broadcast to all of the subscribers of the conditional access system, a portion of the subscribers, or an individual subscriber. Service instances include regular programming, special programming such as pay-per-view, and subscriber requested services such as personal television.

The distribution system can include a variety of media, which can handle multiple in-band signals. Typically, in a subscriber system, such as a cable television system, the in-band signals are 6 MHz wide, which correspond to the bandwidth used to transmit a conventional analog television program. Today, many programs and service instances are transmitted in a digital format, such as, but not limited to, motion picture experts group (MPEG) because MPEG programs require less bandwidth than conventional analog programs.

MPEG Programming

In a digital format, a program is encoded into its elementary parts, such as video, audio, etc. Frequently, a program can use more than one audio track so that the program can be heard in several different languages such as English, French, Spanish, or German, and each audio track is an elementary stream of the program. Programs may also have accompanying data tracks such as for closed-captioning. The program is further encoded so that the elementary parts are packetized into multiple packets. MPEG is a common format used for packetizing a digital program. A packet identifier (PID) identifies each of the packets, and all of the packets that make up an elementary part of the program have the same PID values. For example, all of the video packets might have the PID value of 251 and, all of the English audio packets might have a PID value of 255, closed-captioning in English 256, etc.

In a conventional analog system, only one analog program is transmitted through a 6 MHz wide pipe, but a 6 MHz wide pipe can carry a transport stream that includes several multiplexed digital programs. Generally, the transport stream is made up of multiple programs or service instances that are multiplexed together. The programs or service instances are carried in elementary streams or PID streams, which are streams of packets having the same PID values, and each PID stream of the transport stream has a unique value. The packets of a program are transmitted in a synchronized manner, such that the packets of the program are received at the appropriate time so that the video and audio are synchronized when the program is viewed. For the purposes of this disclosure, a digital transport stream is described in terms of an MPEG transport stream, but this is for exemplary purposes only.

In an MPEG transport stream, the PID values range from 0 to 8,191. Certain PID values such as zero and 8,191 are reserved and are assigned to packets having specific information or functions. For example, stuffing packets, which are assigned the PID value of 8,191, are filler packets that are inserted into the transport stream when there are no other packets available for transmission. Program association tables (PATs) are assigned the PID value of zero, and are used to map programs to their program map tables (PMTs). (Each program of a transport stream has a unique program number.) For example, a program such as "The Dirty Dozen" can have the program number of 15, and in that case, the PAT maps program number 15 to a PMT, such as PMT 256. The PMT 256 is the packet of the transport stream that has the PID value 256, and PMT 256 maps the elementary streams of program 15 to their PID streams. For example, PMT 256 maps the video stream of "The Dirty Dozen" to PID stream 262, and English audio stream to PID stream 263.

MPEG as referenced in this application is described in the MPEG-1, MPEG-2 and MPEG-4 standards. The MPEG-1 standards (ISO/IEC 11172), the MPEG-2 standards (ISO/IEC 13818) and the MPEG-4 standards (ISO/IEC 14496) are described in detail in the International Organization for Standardization document ISO/IEC JTC1/SC29/WG11 N (June 1996 for MPEG-1, July 1996 for MPEG-2, and October 1998 for MPEG-4), which is hereby incorporated by reference.

Subscriber Television Network

Referring to FIG. 1, a digital broadband distribution system (DBDS) 100 includes, in one example among others, a headend 102, a plurality of hubs 104, multiple nodes 106, a plurality of subscriber locations 108, and a plurality of digital subscriber communication terminals (DSCTs) 110. The headend 102 provides the interface between the DBDS 100 and content and service providers 114, or entitlement agents, such as broadcasters, internet service providers, and the like via communication link 162. The transmission medium 162 between the headend 102 and the content and service providers 114 is typically two-way, thereby allowing for two-way interactive services such as Internet access via DBDS 100, video-on-demand, interactive program guides, etc. In the preferred embodiment, the hubs 104 are also in direct two-way communication with the content and service providers 114 via communication link 162 for providing two-way interactive services.

In the preferred embodiment, the headend 102 is in direct communication with the hubs 104 via communication link 150. In addition, the headend 102 is in direct communication with the nodes 106 via communication link 152 and in direct communication with the subscriber locations 108 via communication link 154. Whether or not the headend 102 is in direct communication with subscriber locations 108 is a matter of implementation.

The hub 104 receives programming and other information, which is typically in a protocol such as ATM or Ethernet, from headend 102 via transmission medium 150. The hub 104 transmits information and programming via transmission medium 152 to nodes 106, which then transmit the information to subscriber locations 108 through transmission medium 154. Whether the hub 104 communicates directly to subscriber locations 108 or to nodes 106 is matter of implementation, and in the preferred embodiment, the hub 104 is also adapted to transmit information and programming directly to subscriber locations 108 via transmission medium 154.

In the preferred embodiment, the transmission medium 150 and 152 are optical fibers that allow the distribution of high quality and high-speed signals, and the transmission medium 154 is either broadband coaxial cable or optical fiber. When the communication path from the headend 102 to the DSCT 110 includes a combination of coaxial cable and optical cable, the communication path is frequently referred to as a hybrid-fiber-coax (HFC) communication path. In alternative embodiments, the transmission media 150, 152 and 154 can include one or more of a variety of media, such as optical fiber, coaxial cable, satellite, direct broadcast, terrestrial digital, Multichannel Multipoint Distribution System (MMDS) or other transmission media known to those skilled in the art. Typically, the transmission media 150, 152 and 154 are two-way communication media through which both in-band and out-of-band information are transmitted. Through the transmission media 150, 152, and 154 subscriber locations 108 are in direct or indirect two-way communication with the headend 102 and/or the hub 104. Typically, when the DSCT 110 is in satellite, MMDS, or terrestrial-digital broadcast communication with the headend 102, the communication path is one-way from the headend 102 to the DSCT 110, but in that case, the DSCT 110 and the headend 102 are in two-way communication via a telephone network (not shown).

The hub 104 functions as a mini-headend for the introduction of programming and services to sub-distribution network 160. The sub-distribution network 160 includes hub 104 and the plurality of nodes 106 connected to hub 104. Having a plurality of hubs 104 that function as mini-headends facilitates the introduction of different programming, data and services to different sub-distribution networks of DBDS 100. For example, the subscriber location 108(*b*), which is connected to node 106(*b*), can have different services, data and programming available than the services, data and programming available to subscriber location 108(*c*), which is connected directly to headend 102, even though the subscriber locations 108(*b*) and 108(*c*) may be in close physical proximity to each other. Services, data and programming for subscriber location 108(*b*) are routed through hub 104 and node 106(*b*); and hub 104 can introduce services, data and programming into the DBDS 100 that are not available through the headend 102. In addition, in one preferred embodiment, the hub 104 and the DSCTs 110 of the hub's sub-distribution network 160 are in two-way communication, which enables the hub 104 to provide real-time conditional access to its DSCTs 110. Details by which the headend 102 provides conditional access to the DSCTs 110 of the DBDS 100 are provided hereinbelow. Because the hub 104 functions as a mini-headend, it can implement the same or similar procedures to provide conditional access.

A DSCT 110, which is located at a subscriber's premises 108, provides among other things, a two-way interface between the DBDS 100 and the subscriber. The DSCT 110 decodes and further process the signals for display on a display device, such as a television set (TV) 112 or a computer monitor, among other examples. Those skilled in the art will appreciate that in alternative embodiments the equipment for first decoding and further processing the signal can be located in a variety of equipment, including, but not limited to, a DSCT, a computer, a TV, a monitor, or an MPEG decoder, among others.

Secure communication between the headend 102 and the DSCTs 110 is preferably accomplished using pairs of asymmetrical keys known to those skilled in the art, such as Rivest, Shamir, & Adleman (RSA) public key encryption technology. Briefly described, an asymmetrical key pair includes a public key, which is distributed to the public, and a private key, which is not distributed. Content that is encrypted with a public key can only be decrypted using the corresponding private key. A message that is signed with a private key is authenticated with the corresponding public key. The headend 102 and the DSCT 110 can securely communicate after they have exchanged public keys.

The headend 102 includes a database (not shown) that has the public key of each to DSCT 110 in the DBDS 100. The headend 102 can securely communicate with a particular DSCT 110 by encrypting the content of a message using the public key of the particular DSCT 110. Only the particular DSCT 110 that has the corresponding private key can decrypt the content of the message. The private key of the headend 102 can also sign the message, and in that case the DSCT 110 uses the public key of the headend 102 to authenticate the message. For details regarding cryptography that a reasonably skilled person would understand see, Bruce Schneier, "Applied Cryptography", John Wiley & Sons, 1994. The DSCT 110 can also communicate with the headend 102 using public key-private key cryptography.

In the preferred embodiment, when the DSCT 110 is manufactured it is assigned a serial number, and it is provided with its own private key-public key pair and with a public key of an access controlling authority. The keys are provided to the DSCT 110 in a secure manner and stored in a protected memory in the DSCT 110. The manufacturer of the DSCT maintains a database that includes the public keys and the serial numbers of each of the DSCTs 110 that the manufacturer produces. Each DSCT 110 in the DBDS 100 has a unique serial number, and the serial number, which can be the MAC address of the DSCT 110, is used for addressing messages to the DSCT 110. The manufacturer provides a copy of the public key and the serial number of each DSCT 110 in the DBDS 100 to the operator of the DBDS 100. In that case, the manufacturer is a key certification authority that certifies to the operator of the DBDS 100 that a given public key belongs to a specific DSCT 110. The operator of the DBDS 100 maintains its database of public keys and serial numbers of each DSCT 110 in the DBDS 100.

In the preferred embodiment, the DSCT 110 is provided with multiple public keys during its manufacture. The DSCT 110 implicitly trusts these public keys because they were given to the DSCT 110 during its manufacture in a secure fashion. Consequently, the DSCT 110 trusts any message that is signed by a private key corresponding to one of these trusted public keys. At least one of the trusted public keys can be replaced by a different public key, which then becomes a trusted public key. To replace a particular trusted public key, the DSCT 110 receives two messages with a new public key included therein. A different private key signs each one of the two messages, and each private key corresponds to one of the trusted public keys stored in the DSCT 110. However, the signing private keys do not correspond to the particular trusted public key that is being replaced. The DSCT 110 uses its trusted public keys to verify that the messages were signed by one of the corresponding private keys, and the DSCT 110 only replaces one of its trusted public keys when the message is verified.

Before the DSCT 110 receives and accesses service instances from the headend 102, the DSCT 110 is registered with the headend 102 and entitled to the service instances. When the DSCT 110 is connected to the DBDS 100, it sends a message, which includes the serial number of the DSCT 110, to the headend 102. The operator of the DBDS 100 compares the serial number of the DSCT 110 against its database and registers the DSCT 110 if the database includes the serial number of the DSCT 110. Generally, the operator of the DBDS 100 replaces one of the trusted public keys of the DSCT 110 with its own trusted public key. This is accomplished by having the manufacturer of the DSCT 110 digitally sign two messages, each of which include the new trusted public key, for the DSCT 110 and then sending the two messages to the DSCT 110.

In one preferred embodiment, the operator of the DBDS 100 acts as the access controlling authority that controls access to the subscriber network. In another embodiment, among others, the manufacturer of the DSCT 110 acts as the access controlling authority. There is conditional access authority (CAA) logic implemented in the headend 102 that the access controlling authority uses for controlling access to the DBDS 100. The conditional access authority sends the DSCT 110 a secure message such as an entitlement management message (EMM), which is digitally signed by a private key of the conditional access authority. For the purposes of this disclosure, a secure message includes, as a non-limiting example, a message that has been digitally signed by the sender so that the recipient can verify the source of the message and verify that the content of the received message was not tampered with nor corrupted in transmission. The content of a secure message may be encrypted when the sender wants to make the content private or the content can be transmitted without encryption.

In the preferred embodiment, the private key of the conditional access authority corresponds to one of the trusted public keys of the DSCT 110. The DSCT 110 authenticates the EMM using the trusted public key of the conditional access authority and acts upon the EMM only if the EMM is authenticated as having come from the conditional access authority. Among other things, the conditional access authority uses EMMs to instruct the DSCT 110 to allocate a portion of its memory for entitlement information related to a service instance provided by an entitlement agent and to provide the DSCT 110 with the public key for an entitlement agent.

The CAA establishes an entitlement agent in the DSCT by having the DSCT 110 partition its memory such that a portion of the memory is allocated to the entitlement agent, and then providing the DSCT with the public key of the entitlement agent. Once the entitlement agent is established with the DSCT, the DSCT 110 sends its public key to the entitlement agent, after which they can securely communicate using signed and encrypted messages. The entitlement agent is authorized by the CAA to manage the portion of the memory allocated to it and to provide entitlements for services associated with the entitlement agent.

The DSCT 110 is preferably in communication with the client-receiver 122 via communication link 120. In the preferred embodiment, the communication link 120 is wireless such as, but not limited to, Institute for Electronics and Electrical Engineers (IEEE) standards 802.11a, 802.11b, 802.11 g, HiperLAN/2, HomeRF 2, Bluetooth 2, and 802.15.3. In alternative embodiments, the DSCT 110 is in communication with multiple client-receivers via one or more communication links, such as, but not limited to, twisted-wire or Ethernet, telephone line, electrical power line and coaxial cable.

The client-receiver 122 is in two-way communication with the DSCT 110 and receives information and service instances therefrom. In one embodiment, the DSCT 110 acts as a proxy for the client-receiver 122, and in that case, the headend 102 transmits service instances and messages to the DSCT 110, and the DSCT 110 then processes the service instances before re-transmitting them to the client-receiver 122. In this embodiment, the headend 102 may or may not be aware of the client-receiver 122. Because the DSCT 110 proxies for the client-receiver 122, the headend 102 and client-receiver 122 need only communicate with the DSCT 110, and neither the headend 102 nor the client-receiver 122 need to be aware of each other's existence. An advantage of this arrangement is that the headend 102 software need not be modified, or only minimally modified, and that the client-receiver 122 only needs to interface with the DSCT 110, which may simplify the design.

In another embodiment, the client-receiver 122 is acknowledged by the headend 102, and the headend 102 communicates with the client-receiver 122 through the DSCT 110. The DSCT 110 still processes messages communicated between the headend 102 and the client-receiver 122, but in this embodiment, the DSCT 110 acts as a facilitator, not as a proxy, for the client-receiver 122. For example, in one embodiment, the DSCT 110 authenticates and when necessary decrypts messages from the headend 102 that are addressed to the client-receiver 122, and other times passes content directly to the client-receiver 122.

In another embodiment, the DSCT 110 is a gateway for the client-receiver 122 and merely passes communication between the client-receiver 122 and the headend 102. In yet another embodiment, the DSCT 110 decrypts messages and other information from the headend 102 and re-encrypts them for the client-receiver 122.

In the latter two embodiments, note that the headend 102 and client-receiver 122 may share secrets of which the DSCT 110 is unaware. Because the DSCT 110 is merely passing messages and does not have the ability to decrypt them, this preserves the privacy of the client-receiver's 122 access to services from the headend 102.

In one preferred embodiment, the DSCT is a gateway that connects the client-receivers 122 to the headend, which assigns IP addresses to the client-receivers 122 and which provides the client-receivers 122 with the IP address of a domain name server (DNS) at the headend 102. The DNS provides the client-receivers 122 with the IP address of the DSCT 110.

In the preferred embodiment, the LAN at the subscriber location 108 is self-aware. When a new client-receiver 122 is brought into the LAN, the client-receiver 122 discovers the network and communicates with the DSCT 110. In one embodiment, the client-receiver 122 and the DSCT 110 communicate via a standard such as Open Server Gateway interface (OSGi). Other non-limiting embodiments include communicating via Universal Plug and Play (UPnP), Home Audio Video Interoperability (HAVi), Jini, and the CableLabs CableHome standard. The choice of a communication protocol is a matter of implementation and factors for choosing the communication protocol include the type of communication link coupling the DSCT 110 to the client-receiver 122 and the type of client-receiver 122. The client-receiver 122 can be any smart appliance including, but not limited to, a laptop computer, a computer, a personal digital assistant (PDA), VCR, another DSCT 110, or television, or the like, adapted to receive information or a service instance from the subscriber network system.

Among other things, the DSCT 110 preferably includes a web-server that provides web-based services and content to the client-receivers 122. The client-receivers 122 and the DSCT 110 communicate with each other and with the web-server using web-based protocols, such as, but not limited to, HTTP carried in TCP/IP packages.

The web-server is adapted to receive content such as, but not limited to, service instances, electronic program guides, advertisements, and other system information and process the content such that the content can be accessed by entitled client-receivers 122 using web-browsers or other web-based technology known to those skilled in the art.

Headend

Figure 2:
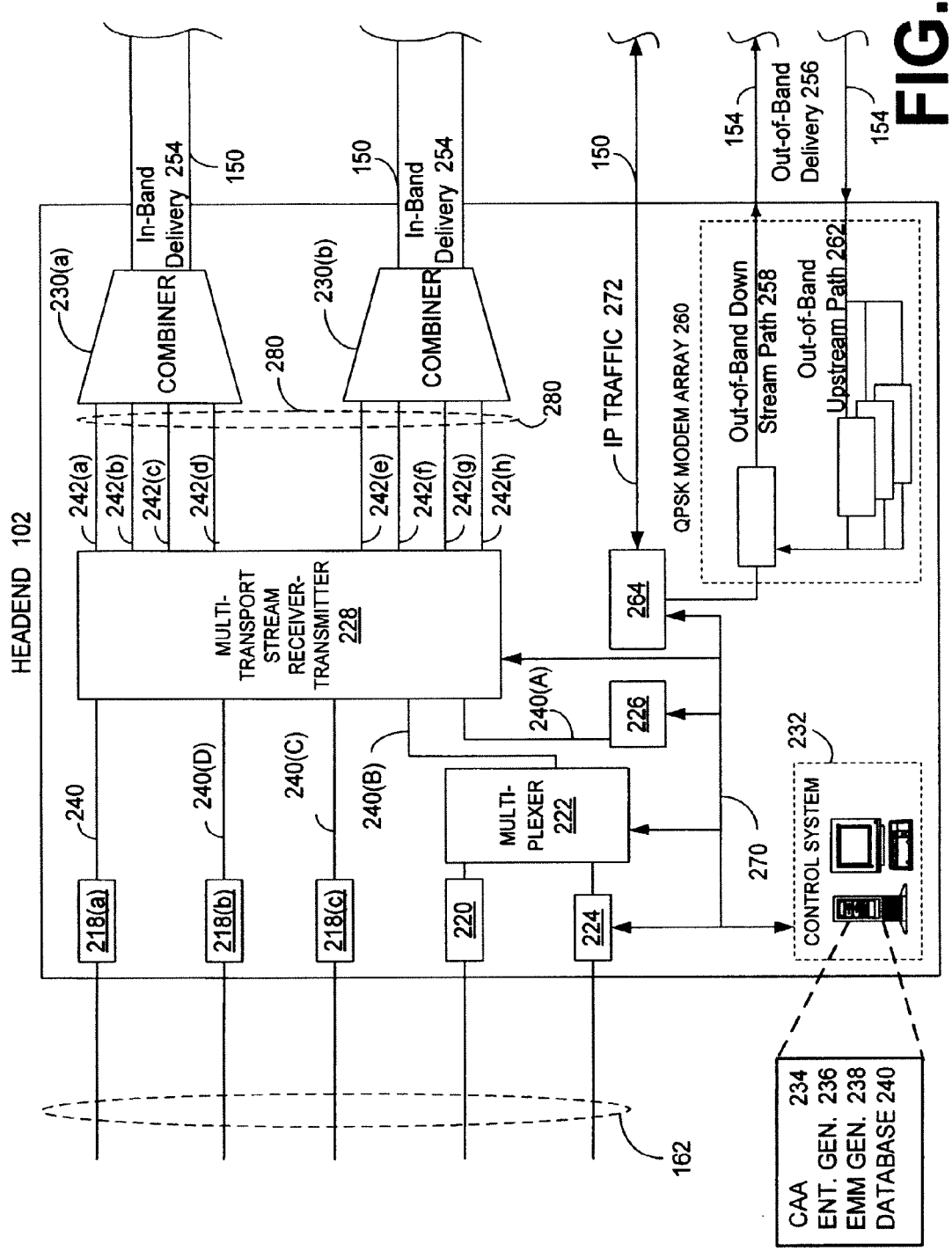
FIG. 2 is a block diagram of a headend in the broadband communication system in which the preferred embodiment of the present invention may be employed.

Referring to FIG. 2, in a typical system of the preferred embodiment of the invention, the headend 102 receives content from a variety of input sources, which can include, but are not limited to, a direct feed source (not shown), a video camera (not shown), an application server (not shown), and other input sources (not shown). The input signals are transmitted from the content providers 114 to the headend 102 via a variety of communication links 162, which include, but are not limited to, satellites (not shown), terrestrial broadcast transmitters (not shown) and antennas (not shown), and direct lines (not shown). The signals provided by the content providers, or entitlement agents, can include a single program or a multiplex of programs.

The headend 102 generally includes a plurality of receivers 218 that are each associated with a content source. Generally, content is transmitted from the receivers 218 as a transport stream 240. MPEG encoders, such as encoder 220, are included for digitally encoding content such as local programming or a feed from a video camera. Typically, the encoder 220 produces a variable bit rate transport stream. Prior to being modulated, some of the signals may require additional processing, such as signal multiplexing, which is preformed by multiplexer 222.

A switch, such as asynchronous transfer mode (ATM) switch 224, provides an interface to an application server (not shown). There can be multiple application servers providing a variety of services such as, among others, a data service, an Internet service, a network system, or a telephone system. Service and content providers 114 (shown in FIG. 1) may download content to an application server located within the DBDS 100 or in communication with DBDS 100. The application server may be located within headend 102 or elsewhere within DBDS 100, such as in a hub 104.

Typically, the headend 102 includes a server such as a video-on-demand (VOD) pump 226. VOD pump 226 provides video and audio programming such as VOD pay-per-view programming to subscribers of the DBDS 100. Usually, the content from VOD pump 226 is provided in the form of the transport stream 240.

It should be noted that the VOD pump 226 is adapted to provide multiple concurrent services to a subscriber location 108, thereby enabling a user of the DSCT 110 to access one of the services and a user of the client-receiver 122 to access another service. The number of services provided from the headend 102 to a single subscriber location 108 is limited by the bandwidth of the DBDS 100 and the number or client-receivers 122 at the subscriber location.

The various inputs into the headend 102 are then combined with the other information, which is specific to the DBDS 100, such as local programming and control information. The headend 102 includes a multi-transport stream receiver-transmitter 228, which receives the plurality of transport streams 240 and transmits a plurality of transport streams 242. In the preferred embodiment, the multi-transport stream receiver-transmitter 228 includes a plurality of modulators, such as, but not limited to, Quadrature Amplitude Modulation (QAM) modulators, that convert the received transport streams 240 into modulated output signals suitable for transmission over transmission medium 280.

In the preferred embodiment, the output transport streams 242 have a bandwidth of 6 MHz centered upon a frequency that is predetermined for each transport stream 242. The frequency for a given transport stream 242 is chosen such that the given transport stream will not be combined with another transport stream at the same frequency. In other words, only transport streams that are modulated at different frequencies can be combined, and therefore, the frequencies of transport streams 242A-D are different from each other, as are the frequencies of transport streams 242E-H. The transport streams 242 from the multi-transport stream receiver-transmitter 228 are combined, using equipment such as combiners 230, for input into the transmission medium 150, and the combined signals are sent via the in-band delivery path 254 to subscriber locations 108.

A control system, such as system controller 232, which preferably includes computer hardware and software providing the functions discussed herein, allows the DBDS system operator to control and monitor the functions and performance of the DBDS 100. The system controller 232 interfaces with various components, via communication link 270, in order to monitor and/or control a variety of functions, including the channel lineup of the programming for the DBDS 100, billing for each subscriber, and conditional access for the content distributed to subscribers. The system controller 232 provides input to the multi-transport stream receiver-transmitter 228 for setting its operating parameters, such as system specific MPEG table packet organization or conditional access information among other things.

Among other things, the system controller 232 prepares system specific information such as electronic program guides, which are periodically transmitted to the DSCT 110 in the DBDS 100. The system controller 232 also includes a domain name server, which provides IP addresses of various components of the DBDS 100 to the client-receivers 122.

In one embodiment, the system controller 232 also includes a central web-server that provides Internet web services to the DSCT 110 and to the client-receivers 122. In this embodiment, the Internet based services provided by the system controller 232 are provided only to subscribers of the DBDS 100. Thus, the Internet based web services of the DBDS 100 are walled off from the World Wide Web (WWW) and the DBDS is commonly referred to as a "walled garden". The Internet based services can include, among other things, the integration of retail services with programming services, which is commonly referred to as television-commerce, or T-commerce. For example, in one embodiment, the subscriber can be watching a service instance via a web-browser a web-based service such as an infomercial. The web-page displaying the infomercial typically includes a "Buy Now" button, which the subscriber uses for purchasing at least one of the items included in the infomercial. Responsive to the subscriber clicking on the "Buy Now" button, a new webpage, a Purchase/Shipping Form, appears, which includes fields such as, but not limited to, "Purchaser," "Billing Address," "Shipping Address," "Method of Payment," "Total Cost," and a pull down menu for Items with a corresponding "Quantity" field. After the subscriber has completed the form, the information is then transmitted to the system controller 232, which processes the order. Typically, the subscriber can choose to have the purchased items billed to his/her subscriber account with the DBDS 100. In an alternative embodiment, the operator of the DBDS 100 will already know information such as "Billing Address," "Shipping Address," and "Method of Payment" due to the ongoing relationship between the subscriber and the operator of the DBDS 100, and consequently, some of the fields in the can be pre-populated.

The system controller 232 includes database 240 and logic for a conditional access authority (CAA) 234, an entitlement generator 236 and an EMM generator 238. The database 240 includes, among other things, the serial numbers and public keys of the DSCTs 110 of the DBDS 100. The EMM generator 238 uses database 240 to generate individually addressable EMM templates; to generate EMM templates for multiple DSCTs 110 and client-receivers 122; and to generate global EMM templates.

In the following discussion, except when otherwise noted or is clear from the content to the contrary, note that references to DSCTs may include DSCTs 110, DSCTs proxying for client-receivers, and client-receivers 122, in various embodiments.

The CAA 234 is used by the access controlling authority to enable DSCTs 110 to receive entitlements for service instances. The CAA 234 receives EMM templates from the EMM generator 238 and uses the EMM template to create an EMM. To create an EMM, the CAA 234 includes a message content and an authentication token in the EMM template. The CAA 234 determines whether the message content should be encrypted, and if so, the CAA 234 encrypts the message content using the public key of the recipient of the EMM, which is retrieved from the database 240. The authentication token of an EMM is generally a one-way hash digest of the message content that has been digitally signed by the private key of the CAA 234. In the preferred embodiment, the recipient, i.e., the DSCT 110, implicitly trusts any EMM that has an authentication token from the CAA 234 because the CAA 234 signs the hash digest with the private key that corresponds to one of the trusted public keys stored in the DSCT 110.

A one-way secure hash function is a cryptographic operation where input is run through some mathematical operations to produce an output, the hash digest, which is a fixed length and which is probably unique. The hash digest has at least two properties: (1) determining the input to the hash function, given the hash digest, is virtually impossible or at least computationally difficult; and (2) a hash digest for an input is essentially unique. In other words, the probability that two different inputs will result in the same output is extremely small. All of the hash digests discussed in this disclosure are generated from secure one-way hash functions, and a signed hash digest is a hash digest that has been processed by a private key. Signing the hash digest with a private key converts the hash digest from a first value to a second value, and resigning the second value with the corresponding public key transforms it back to the first value. The only way to convert the second value back to the first value is to resign the second value with the public key that corresponds to the private key that originally signed the hash digest.

In the preferred embodiment, the DSCT 110 includes partitionable memory and the CAA 234 partitions the memory of the DSCT 110 using EMMs. The DSCT 110 only partitions its memory in response to EMMs from the CAA 234. The CAA 234 instructs the DSCT 110 to allocate a portion of its memory to the entitlement generator 236 and provides the DSCT 110 with the public key of the entitlement generator 236. Once the DSCT 110 has the public key of the entitlement generator 236, the entitlement generator 236 can securely communicate with the DSCT 110, and thereby provide entitlements for service instances to the DSCT 110. The CAA 234 can also disable the entitlement generator 236 by having the DSCT 110 unallocate the allocated memory. For details regarding allocating and configuring memory in the DSCTs, see U.S. Pat. No. 5,742,677, Pinder et al., Information Terminal Having Reconfigurable Memory, filed Apr. 3, 1995, which is hereby incorporated by reference in its entirety.

The entitlement generator 236 generates encryption information and the entitlements of the DSCTs for the service instances. The entitlement generator 236 provides the encryption information to the multi-transport stream transceiver 228, which generates control words therefrom for encrypting the service instances. In the preferred embodiment, the encryption information is a multi-session key (MSK), which has a relatively long life, such as days, weeks, or months. The MSK is transmitted to the DSCTs 110 in EMMs created by the entitlement generator 236.

The entitlement generator 236 receives EMM templates from the EMM generator 238 for creating EMMs. The EMMs from the entitlement generator 236 also include an authentication token, which is a hash digest digitally signed by the private key of the entitlement generator 236, and the hash digest is a digest of the message content. In some situations, the entitlement generator 236 produces a hash digest of at least a portion of the message content and a secret that is known to the recipient. The entitlement generator 236 determines whether to encrypt the message content and when it is determined to do so, it uses the recipient's private key to encrypt the message content. Typically, when the message content is determined to be private, such as when the content includes an MSK, it is encrypted.

In an alternative embodiment, the system controller 232 includes a main computer and a plurality of transaction encryption devices, which are coupled to the main computer via a secure link, such as a secure dedicated Ethernet connection. Each transaction encryption device includes a processor and a memory for implementing cryptographic algorithms. In this embodiment, the CAA 234 resides in a first transaction encryption device and an entitlement generator 236 resides in each of the remaining transaction encryption devices. Each one of the transaction encryption devices, which have an entitlement generator, is associated with either an entitlement agent or a content provider. An entitlement agent or content provider can use his or her associated transaction encryption device to provide entitlements to the DSCTs 110. In this manner, multiple entitlement agents or content providers can provide content to the DBDS 100, and the operator of the DBDS 100 can delegate the responsibility of providing entitlements to the entitlement agents or content providers.

Control information such as EMMs and other data can be communicated to DSCTs 110 via the in-band delivery path 254 or to DSCTs 110 connected to the headend 102 via an out-of-band delivery path 256. The out-of-band data is transmitted via the out-of-band downstream path 258 of transmission medium 154 by means such as, but not limited to, a Quadrature Phase-Shift Keying (QPSK) modem array 260, or an array of data-over-cable service interface specification (DOCSIS) modems, or other means known to those skilled in the art. Two-way communication utilizes the upstream portion 262 of the out-of-band delivery system. DSCTs 110 transmit out-of-band data through the transmission medium 154, and the out-of-band data is received in headend 102 via out-of-band upstream paths 262. The out-of-band data is routed through router 264 to an application server or to the VOD pump 226 or to system controller 232. Out-of-band control information includes such information as a pay-per-view purchase instruction and a pause viewing command from the subscriber location 108 (shown in FIG. 1) to a video-on-demand type application server, and other commands for establishing and controlling sessions, such as a Personal Television session, etc. The QPSK modem array 260 is also coupled to communication link 152 (FIG. 1) for two-way communication with the DSCTs 110 coupled to nodes 106.

The router 264 is used for communicating with the hub 104 through transmission medium 150. Typically, command and control information among other information between the headend 102 and the hub 104 are communicated through transmission medium 150 using a protocol such as but not limited to Internet Protocol. The IP traffic 272 between the headend 102 and hub 104 can include information to and from DSCTs 110, which are connected to the hub 104.

In the preferred embodiment, the multi-transport stream receiver-transmitter 228 is adapted to encrypt content prior to modulating and transmitting the content. Typically, the content is encrypted using a cryptographic algorithm such as the Data Encryption Standard (DES) or triple DES (3DES), Digital Video Broadcasting (DVB) Common Scrambling or other cryptographic algorithms or techniques known to those skilled in the art. The multi-transport stream receiver-transmitter 228 receives instructions from the system controller 232 regarding the processing of programs included in the input transport streams 240. Sometimes the input transport streams 240 include programs that are not transmitted downstream, and in that case the system controller 232 instructs the multi-transport stream receiver-transmitter 240 to filter out those programs. Based upon the instructions received from the system controller 232, the multi-transport stream receiver-transmitter 228 encrypts some or all of the programs included in the input transport streams 240 and then includes the encrypted programs in the output transport streams 242. Some of the programs included in input transport stream 240 do not need to be encrypted, and in that case the system controller 232 instructs the multi-transport stream transmitter-receiver 228 to transmit those programs without encryption. The multi-transport streams receiver-transmitter 228 sends the DSCTs 110 the information used to decrypt the encrypted program. It is to be understood that for the purposes of this disclosure a "program" extends beyond a conventional television program and that it includes video, audio, video-audio programming and other forms of services and digitized content. "Entitled" DSCTs 110 and client receivers 122 are allowed to use the decryption information to decrypt encrypted content, details of which are provided hereinbelow.

The multi-transport stream transmitter/receiver 228 uses the MSK from the system controller 232 to encrypt service instances. The multi-transport stream transmitter/receiver 228 includes a counter that produces a numerical value every couple of seconds or so and an encryptor. The encryptor uses the MSK to encrypt the counter value to produce a control word. The control word is used by the encryptor as a key for encrypting a portion of the service instance.

The multi-transport stream transmitter receiver 228 includes the counter value in an entitlement control message (ECM), which is multiplexed into the output transport stream 242. Typically, ECMs are transmitted without being encrypted so that the DSCTs do not have to spend time to decrypting the content of the ECM before generating the control word. However, the ECMs include an authentication token that is used for authenticating the message content and limiting access thereto, as will be explained in detail hereinbelow. Typically, the authentication token is a hash digest of the message content and a secret that is shared with the DSCTs 110, such as the MSK. Only DSCTs that have the MSK will be able to encrypt the counter value of the ECM to generate the control word that decrypts the service instance.

In the preferred embodiment, the entitlement generator 236 associates each encrypted service instance, with a unique entitlement specifier, which is included in the ECM. A DSCT 110 uses the entitlement specifier to determine whether the DSCT 110 is entitled to the service instance.

In the preferred embodiment, the hub 104, which functions as a mini-headend, includes many or all of the same components as the headend 102. The hub 104 is adapted to receive the transport-streams 242 included in the in-band path 254 and redistribute the content therein throughout its sub-distribution network 160. The hub 104 includes a QPSK modem array (not shown) that is coupled to communication links 152 and 154 for two-way communication with DSCTs 110 that are coupled to its sub-distribution network 160. Thus, it is also adapted to communicate with the DSCTs 110 that are coupled to its sub-distribution network 160, with the headend 102, and with the content providers 114.

DSCT 110

Figure 3:
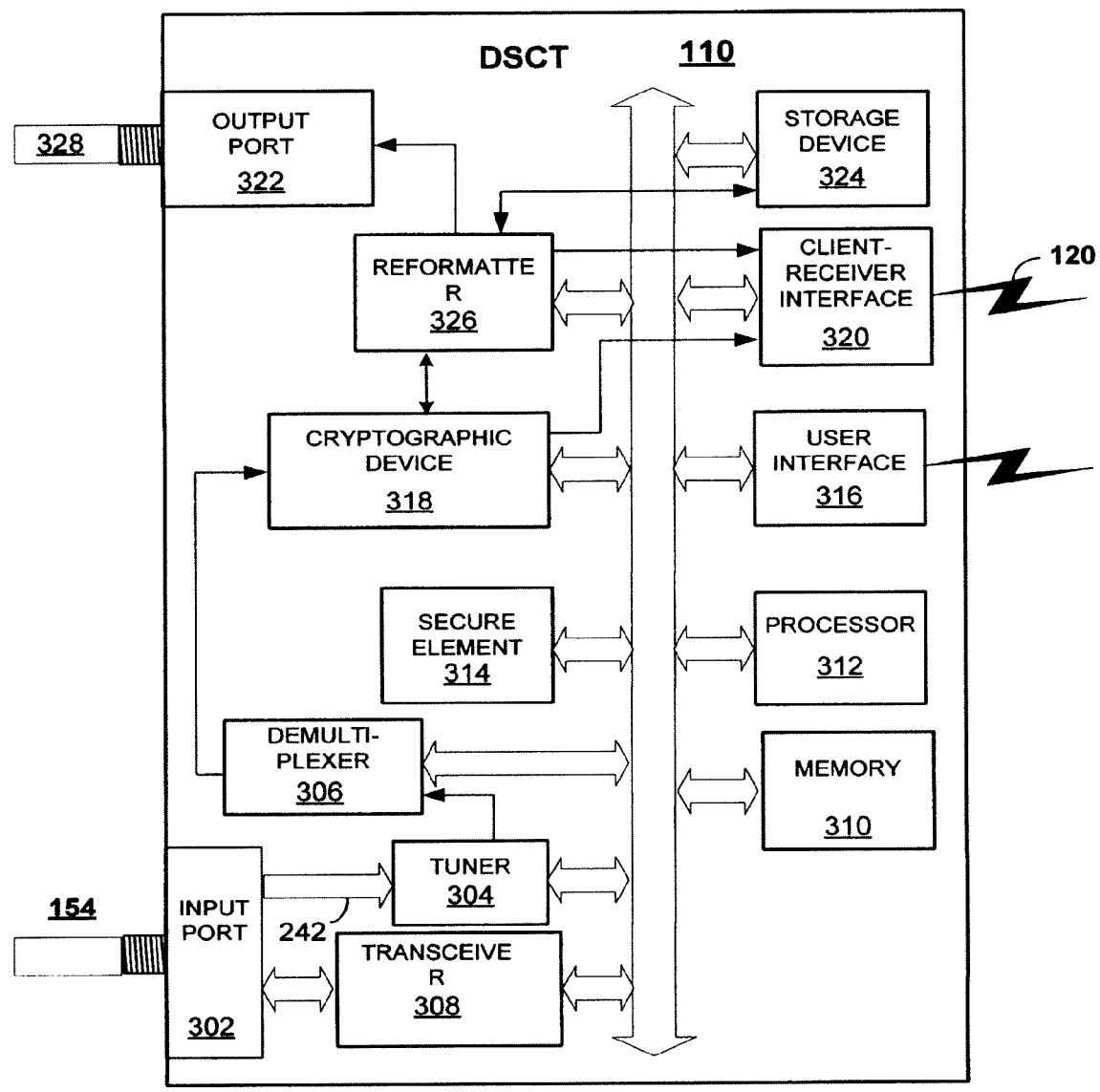
FIG. 3 is a block diagram of the digital subscriber communication terminal.

Referring to FIG. 3, the DSCT 110 preferably includes an input port 302, multiple tuners 304, a demultiplexer 306, a transceiver 308, a memory 310, a processor 312, a secure element 314, a user-interface 316, a cryptographic device 318, a client-receiver interface 320, an output port 322, a storage device 324, and a reformatter 326.

The DSCT 110 is adapted to receive in-band and out-of-band communication at the input-port 302 and adapted to output signals via the output-port 322 and at the client-receiver interface 320. The output-port 322 couples to a connector 328, which provides a communication link between the DSCT 110 and a subscriber device such as, but not limited to, a television, a VCR, a computer, or the like.

In the preferred embodiment, the communication link 120 is a wireless communication link, and the client-receiver interface 320 is a card that can be installed in the DSCT 110 by a user or qualified technician. The client-receiver interface 320 includes a transceiver for communicating with the client-receiver 122. In the preferred embodiment, the bandwidth of the client-receiver interface 320 is such that it can communicate with multiple client-receivers 122. In one embodiment, the DSCT 110 is adapted to accept multiple client-receiver interfaces 320 for communicating with multiple client-receivers 122. In an alternative embodiment, the client-receiver interface 320 includes a transceiver for a wired communication link between the DSCT 110 and the client-receiver 122. The wired communication link can be, but is not limited to, twisted wire pair, Ethernet, telephone lines, and electrical wiring. In yet another embodiment, the DSCT 110 includes multiple client-receiver interfaces 320 for communication with more than one client-receiver 122. In an alternative embodiment, instead of the client-receiver interface 320 being a card that is installable by the subscriber, the client-receiver interface 320 is a fixed part of the DSCT 110. Whether the client-receiver interface 320 is an installable card or not is a matter of implementation.

Typically, the number of tuners 304 is equal to the number of transceivers 308 plus one, and one of the tuners is associated with the output port 322 and the remaining tuners 304 are associated with the multiple client-receiver interfaces 320.

The operation of the DSCT 110 shall first be described with respect to a television coupled to output-port 322 and then, secondly, with respect to a client-receiver 122. The DSCT 110 includes a user-interface 316, such as an infrared receiver, through which the user enters commands, such as selecting a "user-channel" for viewing a selected service instance. It is important to remember that a "user-channel" is not a conventional television channel. A conventional television channel in a cable television system is a 6 MHz band (which carries one analog program) centered on a particular frequency. However, today a "user-channel" conceptually corresponds to a service instance or a string of service instances in the preferred embodiment of the present invention. Frequently, multiple service instances are multiplexed together in a transport stream, and the transport stream is RF modulated and transmitted in a 6 MHz band. Thus, a single 6 MHz band carries multiple service instances or user-channels. When a user changes programs or service instances by selecting a new user-channel, the new user-channel and the old user-channel might be carried in the same 6 MHz band or in different 6 MHz bands. So it is important to distinguish between a conventional channel and a user-channel. It is to be understood user-channel represents one type of communication channel. Communication channels include, but are not limited to, communication signals that are separated by: frequency, which is generally referred to as frequency-division multiplexing (FDM); time, which is generally referred to as time-division multiplexing (TDM); and code, which is generally referred to as code-division multiplexing (CDM).

In the preferred embodiment, the transceiver 308 receives out-of-band communication 258 from input port 302. The out-of-band communication data includes among other things system tables and messages including secure messages such as EMMs. EMMs are sent to the secure element 314 for processing and the system tables are stored in memory 310.

Out-of-band data also preferably includes information such as electronic program guides and other system specific information. In one embodiment, system specific information is periodically transmitted from the headend 102 by a broadcast file system (BFS) server conceptually, the information transmitted by the BFS server is on a carousel and is cyclically transmitted. The BFS periodically transmits an index of the information included on the carousel, and the DSCT uses the index to determine when specific information of the carousel will be transmitted. The DSCT 110 stores the index in memory 310 so that it can determine when information on the carousel of the BFS will be transmitted. Typically, the determination is done by determining the sequential relationship between what is currently being transmitted from the carousel of the BFS and some desired information on the carousel.

In an alternate embodiment for satellite, and other one-way media, the downstream "out-of-band" data and the data carousel are multiplexed with the program information.

In the preferred embodiment, the transceiver 308 is tunable over a range of predetermined frequencies and is controlled by processor 312. In an alternative embodiment, the DSCT 110 includes a plurality of tunable transceivers, and each one of the transceivers is controlled by either the processor 312 or by one of the client-receivers 122. Other alternate embodiments include the DSCT 110 receiving services via satellite, MMDS, or terrestrial-digital broadcast.

In the preferred embodiment, the system tables stored in memory 310 are tables of system information such as encryption tables, which identify, among other things, whether a program is encrypted or not. System tables are prepared by the system controller 232 and transmitted to the DSCT 110 via in-band or out-of-band communication paths.

The processor 312 receives the user-input from the user-interface 316 and determines the frequency band that contains a selected user-channel. Generally, the multiplexed service instances are in the form of MPEG programs. In that case, the processor 312 consults system information tables, which are stored in memory 310, to determine the frequency band of the selected user-channel and the MPEG program number for the selected user-channel. The processor 312 instructs the tuner 304 to tune to the desired frequency band.

The tuner 304 receives in-band communication from input-port 302, which is coupled to the transmission medium 154. In response to instructions from the processor 312, the tuner 304 tunes to the specified frequency band.

The demultiplexer 306 receives the transport stream 242 from the tuner 304 and extracts the PAT (PID=0) from the received transport stream. The processor 312 uses the PAT to determine the PMT for the selected user-channel and uses the PMT to determine the PID values of the elementary streams that make up the program carried in the selected user-channel. The demultiplexer 306 extracts the elementary streams of the program carried in the user-channel and sends the elementary streams to the cryptographic device 318.

The processor 312 uses the encryption table stored in memory 310 to determine whether the elementary streams are encrypted. When the elementary streams are encrypted, the cryptographic device decrypts them using decryption information from the secure element 314. Elementary streams that are not encrypted pass through the cryptographic device 318 to the reformatter 326.

Generally, the PMT of a service instance includes the PID value of the ECM for the service instance. In that case, the processor 312 tells the tuner 304 to extract those ECMs and send them to the secure element 314. The ECMs include information used for decrypting the selected service instance and also include an entitlement specifier.

The secure element 314 is used for, among other things, providing the cryptographic device 318 with the control word used for decrypting the selected service instance. It is important to note that in the conditional access system of the DBDS 100 the DSCT 110 might not be able to access a selected service instance even though the DSCT 110 has the necessary keys used for decrypting the selected service instance. In other words, in addition to having all the keys used in accessing the selected service instance, the DSCT 110 must be "entitled" to access the selected service instance. The DSCT 110 receives entitlements for service instances from the Entitlement Generator 236 of the system controller 232.

When the DSCT 110 is entitled to the selected service instance, the secure element 314 provides the cryptographic device 318 with the control word used for decrypting the selected service instance. The cryptographic device 318 decrypts the selected service instance using the control word from the secure element 314 and the decrypted service instance is sent to the output port 322. The manner in which the secure element 314 determines whether the DSCT 110 is entitled is described in detail hereinbelow.

The reformatter 326 receives decrypted MPEG packets from the cryptographic device 318 and converts the content of the MPEG packet to another format such as, but not limited to, Real Video 8, Windows Media Video 8, Windows Media Video 9, QuickTime, H.323, MPEG-4, H.264, MPEG-2, Macromedia Flash, Macromedia Shockwave National Television System Committee (NTSC) format. In addition, when the output format is MPEG, the reformatter is adapted to remap the PIDs, resynchronize timestamps, demultiplex and/or remultiplex streams, or make other adjustments to the MPEG transport stream in accordance to instructions from the processor 312. The processor 312 determines whether and, if necessary, how the content should be converted, and whether it should be converted, using criteria such as the type of device that receives the user-selected service and the communication link between the DSCT 110 and the user device. For example, when the user device coupled to the output port 322 is a TV or a VCR, the reformatter converts the selected service from an MPEG format to an NTSC format. In addition, in one preferred embodiment, the reformatter 326 is also adapted to encapsulate application packets such as MPEG packets into network packets such as, but not limited to, Ethernet packets. Thus, service instances can be transmitted over the LAN to the client-receiver 122 by utilizing network protocols.

It should be emphasized that in one preferred embodiment, the reformatter 326 is upgradeable, and it is not limited to reformatting content to the exemplary formats given hereinabove. In the event of a new format or a new release of program such as, but not limited to, Real Video, Windows Media Video, or QuickTime, updated/new logic is downloaded from the headend 102 into the DSCT 110. The reformatter 326 implements the downloaded logic to convert the content into another format. Thus, the DSCT 110 does not become obsolete because of a new standard or because of a new release for an existing standard.

The reformatter 326 can send the reformatted content to the output port 322 or to the cryptographic device or to the client-receiver interface 320. When the content of the user-selected service is accessed via a user device coupled to the output port 322, the content is generally sent from the reformatter 326 to the output port 322. However, when the content is accessed via the client-receiver 122, then the processor 312 may decide to encrypt the content. In that case, the reformatted content is provided to the cryptographic device 318, which then encrypts the content and sent therefrom to the client-receiver interface 320.

The processor 312 may decide not to encrypt the reformatted content, and in that case, the reformatter 326 provides the content to the client-receiver interface 320. In determining whether or not to encrypt the reformatted content, the processor 312 can use criteria such as, but not limited to, the fidelity of the reformatted content. Services instances that are carried in MPEG format have a high degree of fidelity and can be readily copied, and the copies have the same degree of fidelity as the original. However, when the service instance is reformatted to a format such as Real Video, or NTSC format, having a lower degree of fidelity, the processor 310 can decide not to encrypt the reformatted content. In that case, unencrypted reformatted content is provided to the client-receiver interface 320.

The DSCT 110 may also include a storage device 324 for storing service instances. The user can use the user-interface 316 to instruct the DSCT 110 to store a received service instance in storage device 324. In another embodiment, the storage device is external to the DSCT 110, and in that case, the service instance is sent to the external storage device through output-port 322 or through an input/output interface (not shown).

A subscriber can use the client-receiver 122 to select services offered by DBDS 100. The client-receiver 122 transmits user-input to the client-receiver interface 320 via communication link 120. Typically, before the user selected service is transmitted to the client-receiver 122, the DSCT 110, among other things, determines an encryption scheme for encrypting information sent to the client-receiver 122 and determines whether the client-receiver 122 is entitled to the selected service.

In one embodiment, the DSCT 110 provides the client-receiver 122 with content that is formatted according to internet protocol such as HTTP, and which can be accessed by a web-browser at the client-receiver 122. In this embodiment, the memory 310 includes web-server logic that is implemented by the processor 312 for providing web-based services. It should be emphasized that the web-server functionality of the DSCT 110 is implemented under the umbrella of conditional access, example details of which are provided herein. Generally speaking, the conditional access umbrella means that the web-server can, among other things, as examples, all of which are not necessary, determine what services to provide to the client-receiver 122; establish and remove entitlements to services; selectively provide services based upon the device-type of the client-receiver 122; and selectively provide services based upon the user of the client-receiver 122. Furthermore, the web-server can be instructed by the headend 102 to add or remove entitlements for the client-receiver 122. Even if the client-receiver has a direct relationship with the headend and the DSCT 110 is unable to process encrypted data, it can still be instructed to block the traffic to the client-receiver 122 and so can still be used to disable services. For example, this capability may be invoked upon non-payment.

The memory 310 also includes client-receiver tables, which are preferably used for, among other things, identifying a client-receiver 122 and establishing secure communication therewith. In one preferred embodiment, the DSCT 110 manages a wireless LAN, and the client-receiver 122 is adapted to discover the wireless LAN when it is brought into the LAN. In an alternative embodiment, the DSCT 110 manages a wired LAN, and the client-receiver 122 discovers the network and the network discovers the client-receiver 122 when the client-receiver 122 is coupled to the DSCT 110 through the network. In another embodiment, the client-receiver is notified of the DSCT and contacts it using the local network. In another embodiment, among others, the DSCT is notified of the existence of the client-receiver via a graphical interface on the DSCT that is edited via the DSCT's infrared remote control.

In addition, in one preferred embodiment, the memory 310 also includes logic for establishing and managing user-accounts. The subscriber of the DBDS 100 can establish user-accounts so that various members of the household or other selected people can access the DBDS 100 via the DSCT 110. Typically, to access a user-account a user must enter a user-name and a password, which are then matched against established usernames and passwords stored in memory 310. In this embodiment, services can be restricted based upon the logged-in user. For example, a parent uses the user-interface 316 to establish an account for a child, and then restricts the account so that the child cannot engage in T-commerce or access other content that the parent does not want the child to access. Alternatively, a password or a username/password combination may only be necessary when requesting restricted services. In one embodiment, usernames, passwords, account permissions, etc. are to stored in the secure element 312.

When the client-receiver 122 transmits a message to the DSCT 110, which includes hardware information about the client-receiver 122, the processor 312 uses the client-receiver tables of memory 310 to identify the device type of the client-receiver 122. For example, the received message includes hardware information that the processor 312 uses to determine whether the client-receiver 122 is a computing device such as a laptop or a personal digital assistant, or a settop device, among others. The DSCT 110 and the client-receiver 122 establish communication using protocols known to those skilled in the art, including but not limited to Open Server Gateway interface (OSGi), Jini, Home Audio/Video interoperability (HAVi), and Universal Plug-n-Play (UPnP). The knowledge about the client-receiver provided by using one of these standards may establish which encryption mechanisms and video encoding formats are possible.

In another non-limiting embodiment, the DSCT 110 receives the message from the client-receiver 122 and forwards at least part of the message to the headend 102. The system controller 232 uses the message from the DSCT 110 and the database 240 to identify the client-receiver 122, and the system controller 232 sends a message to the DSCT 110 that instructs the DSCT 110 on how or whether to establish secure communication with the client-receiver 122.

The memory 310 includes logic for dynamic encryption scheme determination. Non-limiting examples of dynamic encryption scheme determination logic include, but are not limited to, secure sockets layer (SSL) protocol, Digital Transmission Content Protection (DTCP), Content Protection for Recordable Media (CPRM), and transport layer security (TLS) protocol. These protocols and other dynamic encryption scheme determination logic known to those skilled in the art are intended to be within the scope of the invention.

Generally, the content transmitted from the DSCT 110 to the client-receiver 122 is transmitted so as to protect the privacy of the communication. The encryption scheme implemented by the DSCT 110 and the client-receiver 122 is determined by considering factors such as the device type of the client-receiver 122, the communication medium, and the content. For example, when the client-receiver 122 is a laptop, the encryption scheme may be different from when the client-receiver 122 is a PDA or settop. Likewise, using wireless communications may necessitate a tighter level of security because the transmissions might exit the premises and be received by an unauthorized person.

Figure 4:
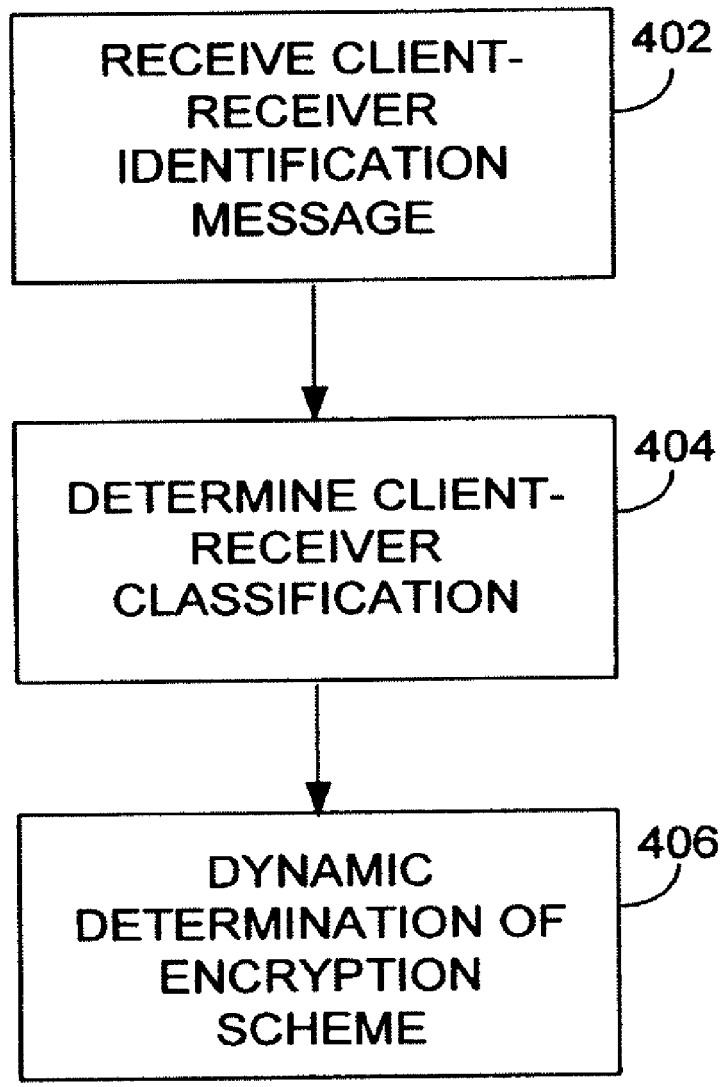
FIG. 4 is a flow chart of steps taken to dynamically establish an encryption scheme.

Referring now to FIG. 4, the steps 400 are implemented for establishing private communication between the DSCT 110 and the client-receiver 122. In step 402, the DSCT 110 receives a client-receiver identification message from the client-receiver. The message is sent to the DSCT 110 when the client-receiver 122 discovers the LAN maintained by the DSCT 110. The message includes device information such as hardware information about the client-receiver 122, which identifies the device-type of the client-receiver 122 such as whether the client-receiver 122 is a settop, a laptop computer, a computer, a PDA, a smart appliance, etc.

In step 404, the processor 312 uses client-receiver tables stored in memory 310 and the received client-receiver identification message to determine a classification for the client-receiver 122. The processor 312 determines an encryption scheme for communicating information and services to the client-receiver 122 using the classification of the client-receiver 122. The processor 312 can determine a first encryption scheme for communicating messages between the DSCT 110 and the client-receiver 122 and a different encryption scheme (or no encryption scheme) for communicating service instances to the client-receiver 122.

In step 406, the processor 312 implements logic for determining an encryption scheme. In the preferred embodiment, the encryption scheme is determined dynamically, when the client-receiver 122 is coupled to the local area network. In an alternative embodiment, the encryption scheme is determined dynamically responsive to dynamic changes in the local area network, such as the amount of content delivered to the client-receiver 122, or responsive to user-input. For example, the user of the client-receiver 122 might desire a different level of encryption than the one that was determined. In that case, user selects the different level, higher or lower, and the DSCT 110 determines a new level of security based upon the input of the user. However, in the preferred embodiment, the DSCT 110 can override the input of the user when determining the encryption scheme, so as to maintain at least a predetermined minimum level of security.

In another non-limiting example, the encryption scheme is dynamically determined responsive to the content type being transmitted to the receiver. For example, when the content type is a program or service instance that is transmitted to the headend 102 to the DSCT 110 without encryption, the content is transmitted to the client-receiver with no encryption or a low level of encryption. Whereas, when the content type is an encrypted program or encrypted service instance, then the content type is transmitted to the client-receiver with a high level of encryption. Thus, when the user of the client-receiver 122 changes from one user-channel to another or requests a different type of content, the encryption scheme is dynamically re-determined.

Once the DSCT 110 has determined the encryption scheme, the client-receiver 122 is informed of the encryption scheme so that the DSCT 110 and the client-receiver 122 can securely and privately communicate. In one embodiment, the DSCT 110 and client-receiver 122 together determine an encryption scheme. In this embodiment, the DSCT 110 has a predetermined minimum-security threshold that must be met, and the DSCT will not determine an encryption scheme beneath the minimum-security threshold. Typically, the client-receiver 122 informs the DSCT 110 that the client-receiver 122 can implement certain encryption schemes, and the DSCT 110 then determines an encryption scheme that meets its minimum security threshold and which is one that the client-receiver 122 can implement.

Figure 5:
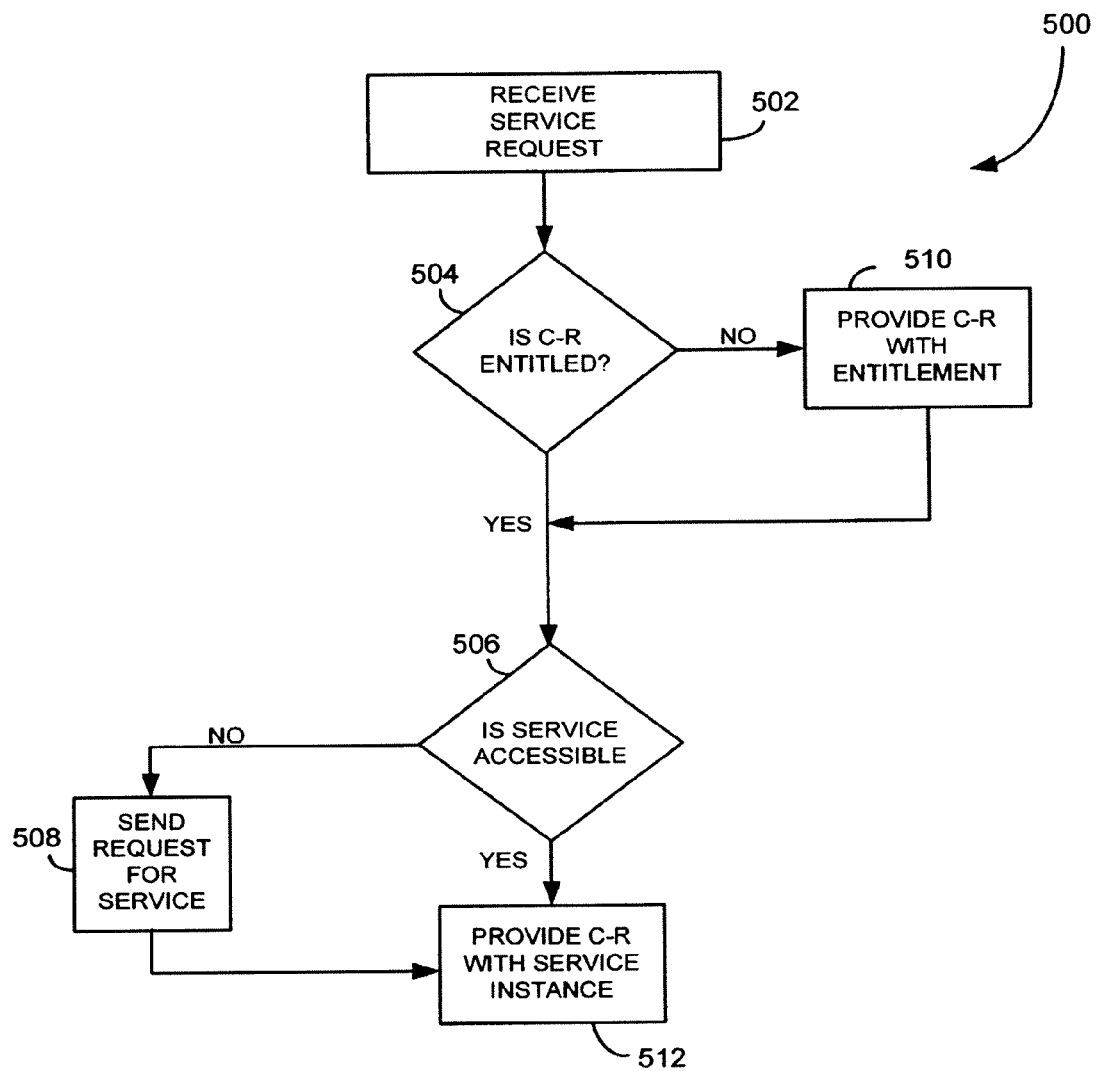
FIG. 5 is a flow chart of steps taken in determining whether to provide a service instance to a client-device.

Referring to FIG. 5, steps 500 are implemented by processor 312 and the secure element 314. In step 502, the DSCT 110 receives a request from the client-receiver 122 for a service instance. The service instance is generally a user selected service instance such as a program selected by the user of the client-receiver 122. In another embodiment, the service instance is a service such as an Internet connection.

In step 504, the secure element 312, which maintains a map of entitlements granted to the client-receiver 122, determines whether or not the client-receiver 122 is entitled to the requested service instance. The entitlement map associates services with entitlements. If the client-receiver 122 is entitled to the service instance, the processor 312 proceeds to step 506 and determines whether the service instance is currently accessible at the DSCT 110. Some service instances are accessible to the DSCT 110 in response to requests by the user. For example, the DBDS 100 might include personal television, whereby the transmission of the service instance is controlled by the user, which means the transmission can be paused, rewound, etc., just like a VCR. Another non-limiting example of a requested service instance includes pay-per-view programming.

If the selected service instance is currently not accessible at the DSCT 110, in step 508, the DSCT 110 sends a request for the service instance to the headend 102. In the preferred embodiment, the secure element 314 generates a secure message for the request of the user and sends it to the transceiver 308 for transmission to the headend 102. In an alternative embodiment, the processor 312 forwards the service request from the client-receiver 122 to the headend 102. In yet another embodiment, the processor 312 generates the service request for client-receiver 122. In response to the request for the service, the headend 102 may provide the service to the DSCT 110. However, in the alternative, the system controller 232 may decide not to send the requested service instance. Generally, the selected service is then included in transport stream 242.

In step 510, the client-receiver 122 is provided with the entitlement for the selected service instance. In the preferred embodiment, the secure element 314 generates the entitlement for the selected service instance and provides the entitlement to the client-receiver 122. Typically, the secure element 314 generates an EMM, which includes the entitlement, and sends the entitlement to the client-receiver 122 via the communication link 120. In this embodiment, the DSCT 110 acts as an entitlement granting authority for the client-receiver 122. The DSCT 110 has the authority and capacity to grant and delete entitlements to the client-receiver 122 for the service instance.

The secure element 314 also updates the entitlement map so that the state of the entitlement associated with the service corresponds to the newly granted entitlement. Thus, the secure element 314 can readily determine whether the client-receiver 122 is entitled to (or is not entitled to), i.e., it is permitted to (or is not permitted to), receive a service instance merely by checking the entitlement map. In addition, the secure element 314 sends a message to the system controller 232 that indicates that the client-receiver 122 has been granted an entitlement. Among other reasons, the system controller 232 is informed of the entitlements granted to the client-receiver 122 so that the subscriber can be billed for the entitled services.

In one preferred embodiment, the secure element 314 generates a secure message requesting entitlement for the selected service instance for the client-receiver 122 and sends the secure message to the entitlement generator 236. Generally, the secure message includes message content that is encrypted by the public key of the entitlement generator and an authentication token, which is a hash digest of the message content signed by the private key of the DSCT 110.

The entitlement generator 236 receives the secure message from the DSCT 110 and provides the entitlement for the selected service instance to the DSCT 110 in an EMM. The secure element 314 of the DSCT 110 then processes the EMM and provides the entitlement to the client-receiver 122. In step 512, the selected service instance is provided to the client-receiver 122. It should be noted that steps 500 are merely exemplary, and in alternative embodiments, more or less, steps are implemented. For example, in another non-limiting example, the processor 312 determines whether or not the client-receiver 122 should be entitled to the selected service instance. In that embodiment, the DSCT 110 can be used to regulate the service instances provided to the client-receiver 122.

In one preferred embodiment, the DSCT 110 receives the service request from the client-receiver 122 and forwards it to the headend 102 without any processing. In that case, headend 102 decides on the encryption scheme used for transmitting the service instance to the client-receiver 122 and the DSCT 110 acts as a gateway for the client-receiver 122. The service request forwarded to the headend 102 includes a subscriber-indicator that identifies a particular subscriber of the plurality of subscribers in the DBDS 100, and the headend 102 uses the subscriber-indicator to determine the particular subscriber. The subscriber-indicator can be, among other things, the serial number/MAC address of the DSCT 110 or a serial number associated with the public-key of the subscriber, and in that case, the service request is signed by the private-key of the subscriber. The headend 102 can use information related to the billing status of the subscriber and/or knowledge of the hardware type for the client-receiver 122 for determining whether to provide the service and for determining the encryption scheme for communicating with the service to the client-receiver 122.

In one preferred embodiment, the DSCT 110 receives service requests from the client-receiver 122 and processes them. The secure element 314 generates a secure message for the service request, and the headend 102 determines whether to entitle or not entitle the client-receiver 122 for the selected services. In addition, when the headend 102 decides to entitle the client-receiver 122 for the requested service, the headend 102 can also determine the encryption scheme for the selected service. In this case, the DSCT 110 acts as a proxy for the client-receiver 122 by forwarding service requests and having the headend 102 make the determinations.

In one preferred embodiment, when the DSCT 110 or the headend 102 determines that the client-receiver 122 is not entitled to a requested service instance, the DSCT 110 sends a service denied message to the client-receiver 122. Upon receipt of the service denied message, the client-receiver 122 informs the subscriber using the client-receiver 122 that the service was denied. Typically, the service is denied when the subscriber has not paid his or her bill. However, the service can also be denied for other reasons such as, failure to determine an appropriate encryption scheme, the client-receiver 122 not having the appropriate hardware and/or software, or the client-receiver 122 having security that is known to be flawed.

In one preferred embodiment, when the DSCT 110 receives a service request from the client-receiver 122, the DSCT 110 determines whether to provide the requested service to the client-receiver based upon local availability of the requested service. When the requested service is currently being used by the DSCT 110 or a different client-receiver, the DSCT 110 can decide not to provide the client-receiver 122 with the requested service.

Figure 6:
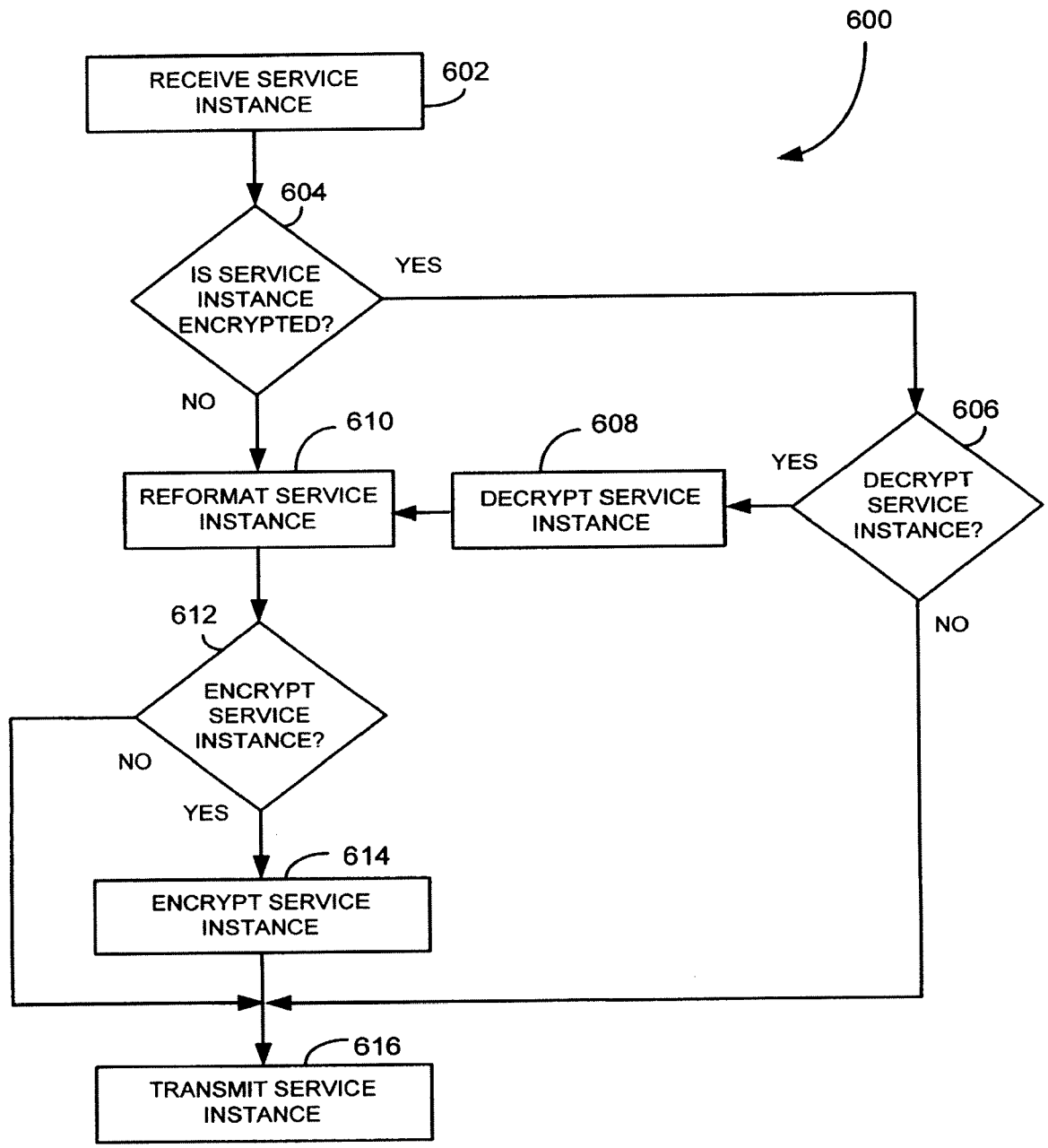
FIG. 6 is a flow chart of steps taken to provide a service instance to a client-device.

Refer now to FIG. 6, in the preferred embodiment, the logic implemented in steps 600 resides in the secure element 314, processor 312, and the cryptographic device 318. In step 602, the selected service instance is received by the demultiplexer 306, which is controlled by processor 312. In an alternative embodiment, the selected service instance is stored on storage device 324 and is retrieved therefrom.

In step 604, the processor 312 uses system tables to determine whether or not the service instance is encrypted. If the selected service instance was encrypted at the headend, the processor 312 determines in step 606 whether the service instance should be decrypted. The processor 312 uses system information tables stored in memory 310 for that determination. If the content of the service instance should not be decrypted, the processor 312 instructs the cryptographic device 318 to pass the service instance to the client-receiver interface 320 without decrypting it. Then in step 616, the client-receiver interface 320 transmits the service instance to the client-receiver 122.

On the other hand, when the processor 312 determines to decrypt the service instance, then in step 608, the processor 312 instructs the cryptographic device 318 to decrypt to the service instance using the control word(s) provided by the secure element 314 and to provide the service instance to the reformatter 326.

In step 610, the reformatter 326 receives the unencrypted service instance from the cryptographic device 318 and reformatting instructions from the processor 312. The reformatter 326 is adapted to convert the content of the MPEG packets carrying the user selected service instance from MPEG to other formats, and it is adapted to pass the packets through without reformatting. The processor 310 can instruct the reformatter 326 not to reformat the content and typically does so when the client-receiver 122 is a settop device or other device adapted to decode MPEG content.

In step 612, the processor 312 determines an encryption scheme for the selected service instance. The encryption scheme can be either to encrypt or not encrypt the selected service instance. This determination is made for both decrypted service instances and for received unencrypted service instances. The processor 312 uses system tables stored in memory 310 for that determination. In one embodiment, the determination includes factors such as the content being sent to the client-receiver 122. For example, when the content is Internet information, email, etc., the content might be encrypted to protect the privacy of the user, even though the information may have been transmitted from the headend 102 without encryption.

The determination on whether to encrypt or not can also include factors such as the format of the content. For example content having a relatively low degree of fidelity is transmitted without encryption. However, when the content is provided in a format having a high degree of fidelity, such as an MPEG format, the content is typically encrypted to prevent pirates from creating high-quality illicit copies. However, after the content has been reformatted into a format having a relatively low degree of fidelity, such as, but not limited to NTSC, the content owners are less concerned about illicit copies, and in that case, the content is transmitted without encryption.

When the processor 312 determines to encrypt the service instance, then in step 614, the service instance is provided to the cryptographic device 318. The cryptographic device 318 encrypts the service instance using an encryption scheme that was dynamically determined by the DSCT 110. Typically, the secure element 314 provides the cryptographic device 318 with the encryption keys used by the cryptographic device 318 to encrypt the service instance.

On the other hand, when the processor 312 determines not to encrypt the selected service instance, the selected service instance is provided to the client-receiver interface 320. In step 616, the client-receiver interface 320 transmits the service instance to the client-receiver 122.

Figure 7:
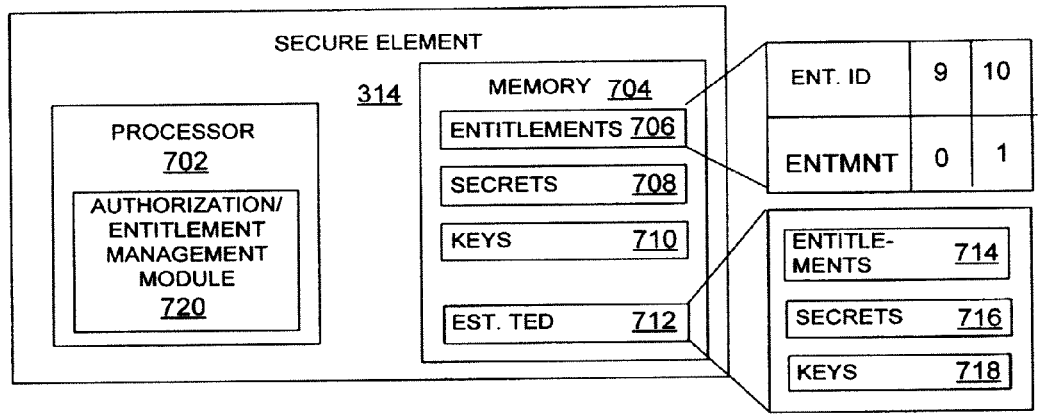
FIG. 7 is a block diagram of a secure element.

Referring to FIG. 7, the secure element 314 includes a processor 702 and a memory 704, which is accessible only to the processor 702. The memory 708 includes entitlements 706, secrets 708, and keys 710. In the preferred embodiment, the processor 702 and memory 704 are packaged in tamper resistant packaging such that no other device other than processor 702 can access the memory 704. The tamper resistant packaging protects the contents of memory 704 and helps insure that private information remains private and confidential.

The keys 710 include a public key-private key pair for the DSCT 110, which were given to the secure element 314 during the manufacture thereof, and public keys for client-receivers 122 that are in the LAN managed by the DSCT 110. The private key of the DSCT 110 is stored in the memory 704 and is not given to any processor other than processor 702. However, the public key of the DSCT 110 is provided to other devices of the DBDS 100, such as the CAA 234 and Entitlement Generator 236 of the system controller 232 and to the client-receiver 122. The holders of the DSCT's public key can use the public key for authenticating messages signed by the private key of the DSCT 110 and also for encrypting messages sent to the DSCT 110.

The secrets 708 are secrets that are shared between the DSCT 110 and the client-receiver 122. In the preferred embodiment, the secrets 708 are used for, among other things, encrypting service instances provided to the client-receiver 122, generating authentication tokens for messages transmitted to the client-receiver 122 and authenticating messages from the client-receiver 122.

The entitlements 706 include an entitlement map for entitlements that have been given to the client-receiver 122. The entitlement map associates an entitlement identifier (ID), which is associated with a service instance, with the client-receiver's entitlement for that service instance. For example, in the exemplary entitlement map 706 the client-receiver 122 is entitled to access the service instance associated with the ID of 10 but not entitled to access the service instance associated with the entitlement ID of 9. Among other things, the entitlement map 706 is used for billing purposes, keeping track of the entitlements granted to the client-receiver 122 so that the subscriber can be properly billed, and for determining which services the client-receiver 122 is entitled to receive. Typically, ECMs, which are associated with a program or service, include a reference to the entitlement ID of the program so that the ECM can be used to look up the entitlement of the DSCT 110 in the entitlement map 706.

The memory 704 also includes allocated memory 712, which has been allocated to the Entitlement Generator 236. The allocated memory 712 includes the entitlements 714 that the Entitlement Generator 236 has given the DSCT 110 to access service instances, secrets 716 used for creating control words to decrypt service instances, and keys 718 from the CAA 234 and the Entitlement Generator 236. The keys 718 include the public key for the Entitlement Generator 236, which the CAA 234 sent to the DSCT 110 in an EMM.

The processor 702 includes an authorization/entitlement management module (AEMM) 720. The AEMM 720 provides entitlements to the client-receiver 122 for service instances. The AEMM 720 also authenticates messages from the client-receiver 122, and generates secure messages for the client-receiver 122. In the preferred embodiment, the AEMM 720 receives EMMs for the DSCT 110 from the headend 102 and secure messages from the client-receiver 122, which the AEMM 720 authenticates. If the EMMs are for the DSCT 110 and are authenticated by the AEMM 720, the DSCT 110 responds to the EMMs and implements them.

Figure 8A:
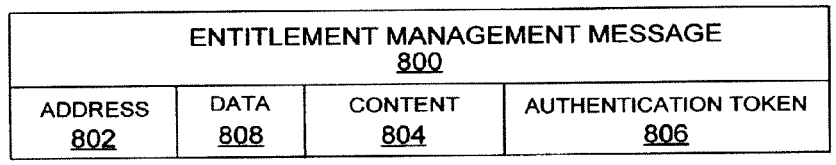
FIG. 8A is a block diagram of an entitlement management message.

Referring now to FIG. 8A, an entitlement management message 800 includes an address field 802, message content 804 and an authentication token 806. EMM 800 is a typical EMM used for securely transmitting information between the headend 102 and the DSCT 110, between the headend 102 and the client-receiver 122, and the between the DSCT 110 and the client-receiver 122. The EMM 800 is also an exemplary secure message.

The address field 802 includes the address of the recipient. For example, the address field 802 of an EMM from the headend 102 to the DSCT 110 includes the IP address or serial number of the DSCT 110. Whereas, in an EMM 800 sent from the DSCT 110 to the client-receiver 122, the address field 802 includes the address of the client-receiver 122 in the local area network maintained by the DSCT 110. In alternative embodiments, the address field 802 is the IP address of the client-receiver or a unique identifier, which is unique to the client-receiver 122 in the DBDS 100. Typically, the address is provided to the secure element 314 by the processor 312 using the tables and memory 310. The message content 804 is the substance of the message. It includes the information that the sender intended the recipient to receive. Depending upon the information included therein, the message content 804 can be encrypted or not. The AEMM 720 determines whether or not the message content is encrypted.

A data field 808 includes data for processing the EMM 800. The data field 808 includes key identifiers that are used for identifying the keys used in encrypting and signing portions of the EMM 800. For example, when the content 804 is encrypted by the public key of the recipient, the data field 808 indicates that the content 804 is encrypted and which public key was used for the encryption.

Whether the message content 804 is encrypted depends upon whether or not privacy is desired. For example, if the message content 804 is a public key, which is typically distributed to multiple elements of the DBDS 100, then the message content 804 might not be encrypted. Whereas, when the message content 804 is related to entitlements, or encryption, or decryption, then the message content 804 will probably be encrypted. Whether the message content 804 is encrypted is a matter of implementation and depends upon the sought after level of security in the DBDS 100.

The authentication token 806 is used for authenticating the purported sender of the EMM 800 and for validating the message content 804, i.e., checking that the received message content is the same as what was sent. In other words, among other things, the recipient of the EMM 800 uses the authentication token 806 to make certain that the message content 804 was not tampered with nor garbled during transmission. Typically, as described below, the private key of the sender signs the authentication token 806.

Figure 8B:
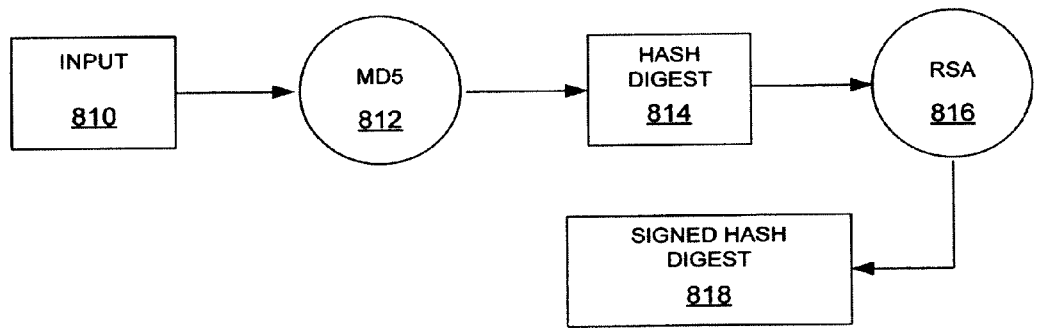
FIG. 8B is a block diagram representing making an authentication token used in the entitlement management message.

FIG. 8B illustrates the exemplary creation of the authentication token 806, where circles denote processes or functions and rectangles denote objects or output. A secure one-way hash function 812, such as MD 5, receives input 810 and produces the hash digest 814. The input 810 includes the unencrypted message content 804 or at least a portion thereof. In an alternative embodiment, the input 810 also includes a secret, which is shared with the recipient of the EMM 800. Typically, the recipient receives the secret in a separate EMM and stores the secret, so that the secret can be used to authenticate subsequent EMMs. For example, secrets 716 are secrets that the Entitlement Generator 236 has given to the DSCT 110, and secrets 708 are secrets the DSCT 110 has given to the client-receiver 122.

The hash digest 814 is a value that is dependent upon the input 810. If the input 810 is changed, the value of the hash digest also changes.

The hash digest 814 is digitally signed by the digital signature function 816 using a cryptographic technique such as RSA, to produce the signed hash digest 818. Digitally signing the hash digest 814 converts the value of the hash digest 814 from a first value to a different value. The value of the signed hash digest 818 is changed back to the original first value of the hash digest 814 by applying the correct key with the correct digital signature function 816 to the signed hash digest 818. In the preferred embodiment, the digital signature function applies a private key to the hash digest 814 to generate the signed hash digest 818, and the corresponding public key is used on the authentication token 818 to regenerate the hash digest 814. In the preferred embodiment, the CAA 234 and the Entitlement Generator 236 of the system controller 232, the DSCT 110 and the client-receiver 122 include the logic for making signed hash digests 818, which are then used as authentication tokens 806.

Referring again to FIG. 7, the AEMM 720 includes the logic for authenticating and decrypting a received EMM 800.

If the EMM is encrypted, the AEMM 720 uses the private key of the DSCT 110 to decrypt the message content, thereby converting the ciphertext content 804 to clear text content. The AEMM 720 uses the cleartext content and the authentication token 806 to authenticate the EMM.

Generally, the AEMM 720 determines whether a shared secret is part of the hash digest using information included in the data field 808, and if it is, then the shared secret is retrieved from memory 704. If there was no shared secret, the AEMM 720 generates a hash digest of the clear text content. However, if there was a shared secret, the AEMM 720 generates a hash digest of the clear text content and the shared secret. Then, AEMM 720 uses the data field 808 of the EMM 800 to determine the purported sender of the EMM 800, and uses the public key of the purported sender to convert the value of the authentication token 806 to the value of the original hash digest 814. Finally, if the original hash digest 814 and the hash digest generated by the recipient have the same value, then the AEMM 720 determines that the EMM 800 is authentic and valid. In other words, the AEMM 720 determines that the EMM 800 did in fact come from its purported sender and the message content 804 has not been corrupted or tampered with.

The AEMM 720 also includes logic for implementing the instructions included in the message content 804. For example, the CAA 234 sends an EMM 800 to the DSCT 110 to establish the Entitlement Generator 236 with the DSCT 110. The AEMM 720 authenticates the EMM 800 as having come from the CAA 234 of the system controller 232 and partitions the memory 704 to create allocated memory 712. For details of allocated memory see Pinder, U.S. Pat. No. 5,742,677, which is hereby incorporated by reference in its entirety. The AEMM 720 then stores the public key of the Entitlement Generator 236 in keys 718. The public key is provided to the DSCT 110 in an EMM from the CAA 234.

The Entitlement Generator 236 can use the allocated memory 712 to provide entitlements for the service instances that are provided to the DBDS 100. The Entitlement Generator 236 sends the DSCT 110 EMMs 800 that are signed by the private key of the Entitlement Generator 236. AEMM 720 uses the public key of the Entitlement Generator 236, which is stored in allocated memory 712, to authenticate the EMMs. When the EMMs 800 are valid, the AEMM 720 acts upon those EMMs. For example, the message content 804 of the EMM 800 can instruct the AEMM 720 to change the entitlements 714. In the preferred embodiment, entitlements for service instances from the entitlement generator 236 are stored in entitlements 714 as an array. Each encrypted service instant is associated with an element in the entitlement array. The entitlement specifier, which is included in the ECM for a given service instance, is used for determining an array element that has the entitlement of the DSCT 110 for the given service instance. In a non-limiting example, the entitlement specifier for "The Dirty Dozen" is 25 and the 25th array element of the entitlements 714 is the entitlement of the DSCT 110 for "The Dirty Dozen." Generally, the entitlement is binary, YES or NO, 1 or 0. Thus, the DSCT is either entitled or not entitled to the service instance. It should be noted that the DSCT 110 can have all of the keys for accessing a service instance but still not be entitled to the service instance, and if it is not entitled, the DSCT 110 does not decrypt the selected service instance.

When a user selects a service instance, the secure element 314 determines whether the DSCT 110 is entitled to the service instance. The AEMM 720 receives the ECM that is associated with the selected service instance, and authenticates the ECM. The ECM includes the entitlement specifier, a control word indicator (the counter value) and an authentication token, which is a hash digest of the control word indicator and a shared secret.

Generally, the shared secret is the MSK, which the entitlement generator 236 sent to the DSCT 110 in a prior EMM and which is currently stored in secrets 716. The AEMM 720 generates a hash digest of the control word indicator and the shared secret and compares the generated hash digest with the authentication token. If they are not the same, the ECM was either garbled in transmission or tampered with. In either case, the ECM is ignored.

ECMs are received every couple of seconds, so if one was garbled another one is received shortly thereafter, which is then authenticated. If the ECM is successfully authenticated, i.e., it has not been tampered with or garbled, then the AEMM 720 checks the entitlement of the DSCT 110 for the selected service instance. The AEMM 720 uses the entitlement specifier of the ECM and the entitlements 714 to determine the DSCT's entitlement. Only if the DSCT 110 is entitled, does the secure element 314 to provide the cryptographic device 318 with the control word for decrypting the service instance. In the preferred embodiment, encrypting the control word indicator using the MSK as the encryption key generates the control word.

In the preferred embodiment, the AEMM 720 includes logic for granting entitlements to the client-receiver 122 for service instances. When the AEMM 720 receives a request from the client-receiver 122 for a service instance, the AEMM 720 determines whether the client-receiver 122 is currently entitled to the service instance by checking the entitlements 706. If the client-receiver 122 is not entitled, the AEMM 720 determines whether to entitle the client-receiver 122. If the AEMM 720 determines to grant the entitlement to the client-receiver 122, the AEMM 720 provides the client-receiver 122 with the entitlement via an EMM, and the AEMM 720 changes the entitlements 706 to reflect the newly granted entitlement. In other words, the array element of elements 706 associated with the service instance would be changed from NO to YES or from 0 to 1. The AEMM 720 can also delete an entitlement for the client-receiver 122 to a service instance by changing the array element that is associated with the service instance. In the preferred embodiment, the client-receiver 122 includes an entitlement map that it uses for accessing received service instances. The AEMM 720 can update the client-receiver's entitlement map by sending the client-receiver 122 an EMM with new entitlements for the client-receiver 122. The client-receiver 122 receives the EMM and processes it, thereby updating its entitlements.

In an alternative embodiment, the memory 704 includes a class-authorization map (not shown), which maps authorizations granted to classes of client-receivers by an entitlement agent to service instances. Before the AEMM 720 checks the entitlements 706 of the client-receiver 122 for a service instance it checks the class-authorization map to determine whether the client-receiver is authorized to receive that service. The AEMM 720 will not grant entitlement for a service instance unless the class-authorization map indicates that the client-receiver 122 is authorized to receive that service. The AEMM 720 only changes or updates the authorization map in response to EMMs from the system controller 232. The class-authorization map maps authorizations by classification of device type. The authorization map can be used by the entitlement agent to selectively control the services offered to different classifications of client-receivers. Thus, client-receivers that are settop devices can be authorized for all services of the DBDS 100, and computing devices can be authorized for a sub-set of services. In the event of a security breach, the authorization map can be updated so as to remove the authorization of an entire class of client-receivers.

In the preferred embodiment, the system controller 232 can send an EMM 800 to the AEMM 720 that suspends the entitlements of the client-receiver 122 to service instances. The system controller 232 can send an entitlement suspension EMM that suspends the entitlement of a specific client-receiver 122 coupled to the DSCT 110 or all client-receivers coupled to the DSCT 110. The system controller 232 may send an entitlement suspension EMM based upon the hardware type of the client-receiver 122. For example, if the operator of the DBDS 100 learns that the security of a particular classification of hardware such as a computer having a given operating system has been compromised, the operator can then have the system controller 232 suspend entitlements for all client-receivers 122 coupled to the DBDS 100 until a fix for the security breach has been established. When the DSCT 110 receives an entitlement suspension EMM, the DSCT 110 suspends transmitting service instances to the client-receiver 122.

In the preferred embodiment, the client-receiver 122 requests services or service instances using secure messages. The processor 702 uses entitlement 706 to determine whether the client-receiver 122 is currently entitled to the requested service instance. If it is not entitled, the processor 702 sends processor 312 a message indicating that the client-receiver 122 has requested a specific service or service instance, and the processor 312 uses tables memory 310 to determine whether the specific service or service instance is blocked. In this embodiment, users can use the user-interface 316 to input information, which is stored in tables of memory 310, to block services or service instances provided to the client-receiver 122. Thus, the DSCT 110 can act as a filter to prevent certain content such as sexually oriented content from being provided to the client-receiver 122. If the requested service instance is not blocked, the processor 702 grants entitlement for the selected service instance and updates entitlement 706. The entitlement for the service instance is transmitted to the client-receiver 122 in an EMM 800.

The system controller 232 can also send an EMM to the DSCT 110 instructing the processor 312 to no longer determine the encryption scheme for the client-receiver 122. In that case, the headend 102 determines the encryption scheme used to communicate information between the DSCT 110 and the client-receiver 122. The headend uses information related to the hardware and software of the client-receiver 122, the type of communication link 120 between the DSCT 110 and the client-receiver 122, and the subscriber's payment status.

Client-Receiver

Referring to FIG. 9, one example client-receiver 122, among others, is in two-way communication with the DSCT 110 via communication link 120. The client-receiver 122 includes a transceiver 902, a processor 904, a memory 906, a secure element 908, a user-interface 910, a cryptographic device 912 and an output port/interface 916. The transceiver 902 receives information such as data, entitlements, authorizations, commands and service instances from the DSCT 110 via communication link 120. The transceiver 902 is adapted to transmit information to the DSCT 110 via communication link 120.

In the preferred embodiment, the client-receiver 122 is adapted to be self-aware and recognize the LAN managed by the DSCT 110 when the client-receiver 122 is brought into the LAN. The processor 904 and memory 906 include the logic for self-awareness. Non-limiting examples of logic for self-awareness include OSGi, UPnP, HAVi, and JINI, all of which are intended to be in the scope of the invention. The memory 906 includes, among other things, system tables, hardware information, web-browser logic, and self-awareness logic. When the client-receiver 122 is introduced into the LAN of the DSCT 110, the processor 904 generates a message using the hardware information and self-awareness logic of memory 906. The message is provided to the transceiver 902, where it is sent to the DSCT 110 via communication link 120. The hardware information identifies the type of hardware included in the client-receiver 122 and is used by the DSCT 110 for determining the type of device the DSCT 110 is communicating with. Alternate embodiments include using either the user-interface 316 on the DSCT 110 or the user-interface 910 on the client-receiver 122 for registering the client-receiver 122.

The user-interface 910 is an infrared detector that receives signals from a remote control device (not shown). In other embodiments, the user-interface 910 is a keyboard, keypad, touchscreen, or other interface known to those skilled in the art by which the user can provide commands to the client-receiver 122.

The user-interface 910 receives commands from the user and provides them to the processor 904 for processing. Using the user-interface 910 the user can request services, change user-channels, open a web-browser window, etc.

When the user requests a service, the processor 904 sends a message be addressed to the DSCT 110 or to elements of the headend 102, such as, for example, the entitlement generator 236 via the transceiver 902. Generally, the message is a secure message, which includes an authentication token. In that case, the secure element 908 generates the secure message and provides the secure message to the transceiver 902 for transmission.

In the preferred embodiment, the secure element 908 includes a processor (not shown) and a memory (not shown) that are included in tamper resistant packaging. Among other things, the secure element 908 generates secure messages; processes received EMMs, and generates control words for the cryptographic device 912. The secure element 908 includes entitlements granted to the client-receiver 122, secrets for authenticating messages and generating control words, and keys such as a private key-public key pair of the client-receiver 122 and other public keys. The other public keys include trusted public keys, the public key of the conditional access authority 234 and the public key of the DSCT 110.

In the preferred embodiment, when the secure element 908 is produced, the manufacturer assigns it a serial number and its public key-private key pair. The manufacturer provides the serial number and the public key of the secure element 908 to the operator of the DBDS 100, which then includes them in its database 240. When the client-receiver 122 is first brought into the LAN of the DSCT 110, it sends the DSCT 110 a message identifying itself and its encryption/decryption capabilities. The DSCT 110 sends a secure message to the CAA 234 informing the CAA 234 that the client-receiver 122 is attempting to register. The CAA 234 determines whether or not the client-receiver 122 is included in its database 240, and if it is, the CAA 234 initiates registration, which can include exchanging one of the trusted public keys of the client-receiver 122 with the public key of the CAA 234. The CAA 234 sends the client-receiver 122 via, the DSCT, an EMM that includes the public key of the DSCT 110, which is then stored in the secure element 908. The client-receiver 122 accepts the public key of the DSCT 110 as a trusted key.

In one embodiment, the secure element 908 is a smart card such as a PC memory cards that is user installable into appropriately configured computers. In another embodiment, the secure element is not user installable such as when the client-receiver 122 is a settop terminal.

The client-receiver 122 receives service instances from the DSCT 110 at the transceiver 902. When the service instances are transmitted in the clear, i.e., without being encrypted, the service instances are provided to the output port 916. When the service instances are transmitted as cipher text, i.e., in encrypted form, the service instances are provided to the cryptographic device 912 for decryption. In the preferred embodiment, the secure element 908 provides control words to the cryptographic device 912 for decrypting the encrypted service instances. Typically, the user device (not shown) such as a video display or speaker is coupled to the outport 916 for providing the service instance to the subscriber.

In one embodiment, the client-receiver 122 receives content from the DSCT 110 that is encapsulated in network packets. Typically, the network packets are Ethernet packets that carry multiple application packets such as MPEG packets. The processor 904 de-encapsulates the MPEG packets and provides the MPEG packets to the cryptographic device 912 for decryption.

In the preferred embodiment, the processor 904 implements web-browser logic stored in memory 906 for, among other things, providing content to the subscriber and for interfacing with the subscriber. FIG. 10 illustrates exemplary steps for accessing web-based services at the client-receiver 122.

In step 1002, the subscriber activates the web-browser logic using the user-interface 910. Typically, an index of web-based services is displayed to the subscriber in the window of the web-browser. The index, which can be an electronic program guide, includes hyperlinks that are associated with the web-based services.

In step 1004, when the user selects a web-based service by clicking on the hyperlink associated with the collected service, the web-browser transmits the request for the service to the DSCT 110. The request for the service includes information such as the uniform resource locator (URL) of the service.

Upon verification that the client-receiver 122 is entitled to the service, or upon having the entitlement to the service granted, the selected service is transmitted to the client-receiver 122. In step 1006, the browser opens a new browser window for viewing the selected service. In the event that the client-receiver 122 is not entitled to and/or cannot get an entitlement to the selected service, the browser displays in the new window "Service Denied."

In step 1008, the service instance from the DSCT 110 is displayed in the new browser window. Typically, the subscriber can use the web-browser interface to engage in T-commerce provided by the DBDS 100. While the subscriber watches the service instance, a pop-up add will appear, and the content of the pop-up add will correspond to the content of the service instance. For example, the subscriber may be watching a golf tournament and the pop-up add will feature the brand of golf clubs for the current golfer leading the golf tournament. The subscriber can then click on the pop-up add and purchase a set of golf clubs.

In one embodiment, when the subscriber using the web-browser initiates the web-browser, the subscriber provides a username and password, which are transmitted to the DSCT 110. The DSCT 110 then verifies the username and password and conditionally provides services to the client-receiver 122. The conditionally provided services can be provided at least based upon the device-type of the client-receiver 122; permissions granted to the user by the subscriber of the DBDS 100; entitlements granted to the client-receiver 122; and upon other criteria.

Those skilled in the art will recognize that the client-receiver 122 can include more or fewer modules than described hereinabove. For example, in a non-limiting alternative embodiment, the client-receiver 122 does not include a secure element 908. The processor 904 provides the cryptographic device 912 with the control words for decrypting received service instances.

Although exemplary preferred embodiments of the present invention have been shown and described, it will be apparent to those of ordinary skill in the art that a number of changes, modifications, or alterations to the invention as described may be made, none of which depart from the spirit of the present invention. Changes, modifications, and alterations should therefore be seen as within the scope of the present invention. It should also be emphasized that the above-described embodiments of the present invention, particularly, any "preferred embodiments" are merely possible non-limiting examples of implementations, merely setting forth a clear understanding of the principles of the inventions.

What is claimed is:

1. A system for transmitting service instances comprising:
a local network at a subscriber premises including:
   at least one remote client device to request service instances; and
   a communications device coupled to said at least one remote client device and including:
      a memory;
      store logic to receive a service instance from a headend and store the service instance in the memory;
      request logic to receive a request for the stored service instance from a remote client device; and
      service logic to determine whether the requesting remote client device is entitled to receive the requested stored service instance, and responsive to determining the requesting remote client device is entitled to receive the requested stored service instance, to transmit the requested service instance to the requesting remote client device.

2. The system of claim 1, wherein said communications device further includes:
   device type logic to determine a device type for the requesting remote client device; and
   reformat logic to determine a format protocol for the requested service instance using the determined device type, and to reformat the requested service instance prior to transmitting the requested service instance.

3. The system of claim 1, wherein the communications device further includes:
   encryption logic to determine an encryption scheme for the requested service instance based on the requesting remote client device, and prior to transmitting the requested service instance, to encrypt the requested service instance.

4. The system of claim 3, wherein the communications device further includes:
   scheme logic to receive a message along with the request from the requesting remote client device, the message having device type information regarding the requesting remote client device, and to determine from the device type information the encryption scheme for encryption of the requested service instance.

5. The system of claim 3, wherein the communications device further includes:
- message logic to receive a message along with the request from the requesting remote client device, the message having device type information regarding the requesting remote client device; and
- headend logic to transmit a second message to the headend, the second message having the device type information included therein, to enable the headend to determine the encryption scheme using at least the device type information.

6. A system for transmitting service instances comprising:
a local network at a subscriber premises including:
- at least one remote client device to request service instances; and
- a communications device coupled to said at least one remote client device and including:
  - request logic to receive a request for a service instance from a remote client device and determine whether the requesting remote client device is entitled to receive the requested service instance; and
  - service logic to determine whether the requested service instance is accessible within the communications device in response to determining the remote client device is entitled to receive the requested service instance, and if the requested service instance is accessible, to transmit the service instance to the requesting remote client device, and if the requested service instance is not accessible, to send a request to a headend for the requested service instance, and to transmit the service instance to the requesting remote client device upon receipt of the service instance from the headend.

7. The system of claim 6, wherein the communications device further includes:
- store logic to store the received service instance in a memory of the communications device prior to transmitting the service instance to the requesting remote client device.

8. The system of claim 6, wherein the communications device further includes:
- device type logic to determine a device type for the requesting remote client device; and
- reformat logic to determine a format protocol for the requested service instance using the determined device type, and to reformat the requested service instance prior to transmitting the requested service instance.

9. The system of claim 6, wherein the communications device further includes:
- encryption logic to determine an encryption scheme for the requested service instance based on the requesting remote client device, and prior to transmitting the requested service instance, to encrypt the requested service instance.

10. The system of claim 9, wherein the communications device further includes:
- scheme logic to receive a message along with the request from the requesting remote client device, the message having device type information regarding the requesting remote client device, and to determine from the device type information the encryption scheme for encryption of the requested service instance.

11. The system of claim 9, wherein the communications device further includes:
- message logic to receive a message along with the request from the requesting remote client device, the message having device type information regarding the requesting remote client device; and
- headend logic to transmit a second message to the headend, the second message having the device type information included therein, to enable the headend to determine the encryption scheme using at least the device type information.

12. A system for transmitting service instances comprising:
a local network at a subscriber premises including:
- a plurality of remote client devices to request service instances; and
- a communications device coupled to said plurality of remote client devices and including:
  - first request logic to receive a first request for a service instance from a first remote client device;
  - first service logic to determine whether the first remote client device is entitled to receive the requested service instance, and responsive to determining the first remote client device is entitled to receive the requested service instance, to transmit the requested service instance to the first remote client device;
  - second request logic to receive a second request for the service instance from a second remote client device in the local network; and
  - second service logic to determine whether the second remote client device is entitled to receive the requested service instance, and responsive to determining the second remote client device is entitled to receive the requested service instance, to transmit the requested service instance to the second remote client device based upon local availability of the requested service instance within the communications device.

13. The system of claim 12, wherein the communications device further includes:
- device type logic to determine a device type for each of the first and second remote client devices; and
- reformat logic to determine a format protocol for the requested service instance using the device type of the first and second remote client devices, and to reformat the requested service instance prior to transmitting the requested service instance.

14. The system of claim 12, wherein the communications device further includes:
- encryption logic to determine an encryption scheme for the requested service instance based on the first and second remote client devices, and prior to transmitting the requested service instance, to encrypt the requested service instance.

15. The system of claim 14, wherein the communications device further includes:
- scheme logic to receive a message along with the request from each of the first and second remote client devices, the message having device type information regarding the respective remote client device, and to determine from the device type information the encryption scheme for encryption of the requested service instance.

16. The system of claim 12, wherein the communications device further includes:
- message logic to receive a message along with the request from each of the first and second remote client devices, the message having device type information regarding the respective remote client device; and headend logic to transmit a second message to a headend, the second message having the device type information included therein, to enable the headend to determine an encryption scheme using at least the device type information.

17. The system of claim 16, wherein the device type information from each of the first and second remote devices includes the same encryption scheme or a different encryption scheme.

18. The system of claim 12, wherein the communications device further includes:
headend logic to determine whether the requested service instance is accessible within the communications device prior to transmitting the requested service instance to the first remote client device, and if the requested service instance is not accessible, to send a request to a headend for the requested service instance and to transmit the service instance to the first remote client device upon receipt of the service instance.

19. The system of claim 18, wherein the requested service instance is accessible if the service instance is stored in a memory of the communications device.

20. The system of claim 18, wherein the communications device further includes:
store logic to store the received service instance in a memory of the communications device prior to transmitting the service instance to the first remote client device.

21. Logic encoded in one or more nontransitory media of a memory device for execution to transmit service instances to a remote client device in a local network, including a communications device and one or more of said remote client devices, at a subscriber premises, and when executed operable for:
receiving a service instance at the communications device of the subscriber premises from a headend, wherein the service instance is stored in memory of the communications device; receiving a request at the communications device for the stored service instance from the remote client device; determining whether the remote client device is entitled to receive the requested stored service instance; and responsive to determining the remote client device is entitled to receive the requested stored service instance, transmitting the requested service instance from the communications device to the remote client device.

22. The logic of claim 21, further operable for:
determining a device type for the remote client device;
using the device type of the remote client device to determine a format protocol for the requested service instance; and
reformatting the requested service instance prior to transmitting the requested service instance.

23. The logic of claim 21, further operable for:
determining an encryption scheme for the requested service instance based on the remote client device; and
prior to transmitting the requested service instance, encrypting the requested service instance.

24. The logic of claim 23, further operable for:
receiving a message along with the request from the remote client device, the message having device type information regarding the remote client device; and
determining from the device type information the encryption scheme for encryption of the requested service instance.

25. The logic of claim 23, further operable for:
receiving a message along with the request from the remote client device, the message having device type information regarding the remote client device; and
transmitting a second message to the headend, the second message having the device type information included therein, wherein the headend determines the encryption scheme using at least the device type information.

26. Logic encoded in one or more nontransitory media of a memory device for execution to transmit service instances to a remote client device in a local network, including a communications device and one or more of said remote client devices, at a subscriber premises, and when executed operable for:
receiving a request at the communications device of the subscriber premises for a service instance from the remote client device; determining whether the remote client device is entitled to receive the requested service instance; responsive to determining the remote client device is entitled to receive the requested service instance, determining whether the requested service instance is accessible within the communications device; if the requested service instance is accessible, transmitting the service instance from the communications device to the remote client device; and
if the requested service instance is not accessible, sending a request from the communications device to a headend for the requested service instance, wherein upon receipt of the service instance at the communications device, transmitting the service instance from the communications device to the remote client device.

27. The logic of claim 26, further operable for, prior to transmitting the service instance to the remote client device, storing the received service instance in memory of the communications device.

28. The logic of claim 26, further operable for:
determining a device type for the remote client device;
using the device type of the remote client device to determine a format protocol for the requested service instance; and
reformatting the requested service instance prior to transmitting the requested service instance.

29. The logic of claim 26, further operable for:
determining an encryption scheme for the requested service instance based on the remote client device; and
prior to transmitting the requested service instance, encrypting the requested service instance.

30. The logic of claim 29, further operable for:
receiving a message along with the request from the remote client device, the message having device type information regarding the remote client device; and
determining from the device type information the encryption scheme for encryption of the requested service instance.

31. The logic of claim 29, further operable for:
receiving a message along with the request from the remote client device, the message having device type information regarding the remote client device; and
transmitting a second message to the headend, the second message having the device type information included therein, wherein the headend determines the encryption scheme using at least the device type information.

32. Logic encoded in one or more nontransitory media of a memory device for execution to transmit service instances to a plurality of remote client devices in a local network, including a communications device, at a subscriber premises, and when executed operable for:

receiving a first request for a service instance at the communications device of the subscriber premises from a first remote client device; determining whether the first remote client device is entitled to receive the requested service instance; responsive to determining the first remote client device is entitled to receive the requested service instance, transmitting the requested service instance from the communications device to the first remote client device; receiving a second request for the service instance at the communications device from a second remote client device in the local network; determining whether the second remote client device is entitled to receive the requested service instance; and responsive to determining the second remote client device is entitled to receive the requested service instance, transmitting the requested service instance from the communications device to the second remote client device based upon local availability of the requested service instance within the communications device.

33. The logic of claim 32, further operable for:

determining a device type for each of the first and second remote client devices;

using the device type of the first and second remote client devices to determine a format protocol for the requested service instance; and reformatting the requested service instance prior to transmitting the requested service instance.

34. The logic of claim 32, further operable for:

determining an encryption scheme for the requested service instance based on the first and second remote client devices; and prior to transmitting the requested service instance, encrypting the requested service instance.

35. The logic of claim 34, further operable for:

receiving a message along with the request from each of the first and second remote client devices, the message having device type information regarding the respective remote client device; and determining from the device type information the encryption scheme for encryption of the requested service instance.

36. The logic of claim 32, further operable for:

receiving a message along with the request from each of the first and second remote client devices, the message having device type information regarding the respective remote client device; and transmitting a second message to a headend, the second message having the device type information included therein, wherein the headend determines an encryption scheme using at least the device type information.

37. The logic of claim 36, wherein the device type information from each of the first and second remote devices includes the same encryption scheme or a different encryption scheme.

38. The logic of claim 32, further operable for:

prior to transmitting the requested service instance to the first remote client device, determining whether the requested service instance is accessible within the communications device; and if the requested service instance is not accessible, sending a request to a headend for the requested service instance, wherein upon receipt of the service instance, transmitting the service instance from the communications device to the first remote client device.

39. The logic of claim 38, wherein the requested service instance is accessible if the service instance is stored in memory of the communications device.

40. The logic of claim 38, further operable for, prior to transmitting the service instance to the first remote client device, storing the received service instance in memory of the communications device.

* * * * *